United States Patent
Won et al.

(10) Patent No.: US 11,521,415 B2
(45) Date of Patent: Dec. 6, 2022

(54) DISPLAY DEVICE

(71) Applicant: Samsung Display Co., Ltd., Yongin-si (KR)

(72) Inventors: Byeong Hee Won, Incheon (KR); Eun Kyung Yeon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 354 days.

(21) Appl. No.: 16/810,242

(22) Filed: Mar. 5, 2020

(65) Prior Publication Data
US 2020/0401777 A1     Dec. 24, 2020

(30) Foreign Application Priority Data

Jun. 21, 2019   (KR) .................. 10-2019-0074284

(51) Int. Cl.
*G06V 40/13*     (2022.01)
*H04R 1/02*      (2006.01)

(52) U.S. Cl.
CPC ......... *G06V 40/1306* (2022.01); *H04R 1/028* (2013.01); *H04R 2400/03* (2013.01); *H04R 2499/15* (2013.01)

(58) Field of Classification Search
CPC .............. G06V 40/1306; H04R 1/028; H04R 2400/03; H04R 2499/15
See application file for complete search history.

(56) References Cited

U.S. PATENT DOCUMENTS

| 2017/0246662 | A1 | 8/2017 | Kidwell, Jr. et al. |
| 2017/0300736 | A1* | 10/2017 | Song .................. G06V 40/1312 |
| 2019/0205603 | A1* | 7/2019 | Lee ..................... H01L 27/3272 |
| 2020/0233469 | A1 | 7/2020 | Won et al. |

FOREIGN PATENT DOCUMENTS

| KR | 10-2013-0060874 A | 6/2013 |
| KR | 10-2016-0096648 A | 8/2016 |
| KR | 10-2018-0105927 A | 10/2018 |
| KR | 10-2020-0083891 A | 7/2020 |
| KR | 10-2020-0089781 A | 7/2020 |

* cited by examiner

*Primary Examiner* — Andrew L Sniezek
(74) *Attorney, Agent, or Firm* — Lewis Roca Rothgerber Christie LLP

(57) ABSTRACT

A display device includes: a display panel including a pixel array layer on one surface of a first substrate for displaying an image; a sound generator for transmitting an ultrasound; and an ultrasonic sensor for receiving an ultrasound reflected by an object on the display panel. The sound generator and the ultrasonic sensor are on the other surface of the first substrate opposite to the one surface of the first substrate. The ultrasonic sensor includes a plurality of ultrasonic sensor units arranged in a matrix form, and the ultrasonic sensor senses the object using the reflected ultrasound received by the plurality of ultrasonic sensor units.

18 Claims, 28 Drawing Sheets

↑ Polarity direction

DISPLAY DEVICE

CROSS-REFERENCE TO RELATED APPLICATION

This application claims priority to and the benefit of Korean Patent Application No. 10-2019-0074284, filed on Jun. 21, 2019, which is hereby incorporated by reference for all purposes as if fully set forth herein.

BACKGROUND

1. Field

Exemplary embodiments and/or implementations of the present disclosure relate generally to a display device.

2. Related Art

With the development of information technology, uses for display devices for displaying images have increased in various forms. For example, display devices are applied to various electronic appliances such as smart phones, digital cameras, notebook computers, navigators, and smart televisions.

As display devices are applied to various electronic appliances, display devices having various functions are useful. For example, in the case of a smart phone, the smart phone includes an ultrasonic detection device for detecting ultrasounds, and the ultrasonic detection device is used as a motion sensor or a fingerprint recognition sensor.

The information disclosed in this Background section is only for providing an understanding of the background of embodiments of the present disclosure, and, therefore, it may contain information that does not constitute prior art.

SUMMARY

Devices constructed according to exemplary embodiments and/or implementations of the present disclosure provide a display device that is capable of motion sensing by combining a sound generator with an ultrasonic detection device.

Additional features of the present disclosure will be set forth in the description that follows, and, in part, will be apparent from the description, or may be learned by practice of the present disclosure.

According to one or more embodiments of the present disclosure, a display device may include: a display panel including a pixel array layer on one surface of a first substrate for displaying an image; a sound generator for transmitting an ultrasound; and an ultrasonic sensor for receiving an ultrasound reflected by an object on the display panel. The sound generator and the ultrasonic sensor may be on the other surface of the first substrate opposite to the one surface of the first substrate. The ultrasonic sensor may include a plurality of ultrasonic sensor units arranged in a matrix form, and the ultrasonic sensor may sense the object by using the reflected ultrasound received by the plurality of ultrasonic sensor units.

Each of the ultrasonic sensor units may include: a first support member on a second substrate; a first cavity including an empty space surrounded by the first support member; a first piezoelectric layer on the first cavity; a first lower electrode between the first piezoelectric layer and the first cavity; and a first upper electrode on the first piezoelectric layer stack.

Each of the ultrasonic sensor units may further include a first mechanical layer between the first cavity and the first piezoelectric layer.

The first cavity may have a circular shape in a plan view.

The display device may further include a main processor that determines a time difference of the reflected ultrasound received by the plurality of ultrasonic sensor units. The time difference may be determined two or more times while the object is in motion, and the main processor may use the two or more time differences to determine the motion of the object.

The time difference may include a first time difference that is determined by a difference between a first time and a second time. The first time may correspond to when the ultrasound is received by a first ultrasonic sensor unit at a left side of the ultrasonic senor and the second time may correspond to when the ultrasound is received by a second ultrasonic sensor unit at a right side of the ultrasonic sensor. The first time may be shorter than the second time when the object is at the left side of the ultrasonic sensor, and the first time may be faster than the second time when the object is at the right side of the ultrasonic sensor. The main processor may determine the motion of the object in a first direction by utilizing the two or more first time differences.

The time difference may include a second time difference that is determined by a difference between a third time and a fourth time. The third time may correspond to when the ultrasound is received by a third ultrasonic sensor unit at a top side of the ultrasonic sensor and the fourth time may correspond to when the ultrasound is received by a fourth ultrasonic sensor unit at a bottom side of the ultrasonic sensor. The third time may be shorter than the fourth time when the object is at the top side of the ultrasonic sensor, and the third time may be faster than the fourth time when the object is at the bottom side of the ultrasonic sensor. The main processor may determine the motion of the object in a second direction by using the two or more second time differences.

The sound generator may include a sound output unit for outputting an audible sound wave by vibrating the display panel, and an ultrasonic output unit for outputting an ultrasound by vibrating the display panel.

The sound output unit may include a first electrode, a second electrode, and a first vibration layer, and the ultrasonic output unit may include a third electrode, a fourth electrode, and a second vibration layer. An area of the first vibration may be larger than an area of the second vibration layer.

According to one or more embodiments of the present disclosure, a display device may include: a display panel including a pixel array layer on one surface of a first substrate for displaying an image; a sound generator for transmitting an ultrasound; and an ultrasonic sensor for receiving an ultrasound reflected by an object on the display panel. The sound generator and the ultrasonic sensor may be on the other surface of the first substrate opposite to the one surface of the first substrate. The ultrasonic sensor may include a plurality of motion pixels, and the ultrasonic sensor may sense the object by using the reflected ultrasound received by the plurality of motion pixels.

The ultrasonic sensor may include a plurality of ultrasonic sensor units, and each of the ultrasonic sensor units may include: a first support member on a second substrate; a first cavity including an empty space surrounded by the first support member; a first piezoelectric layer on the first cavity;

a first lower electrode between the first piezoelectric layer and the first cavity; and a first upper electrode on the first piezoelectric layer.

Each of the ultrasonic sensor units may further include a first mechanical layer between the first cavity and the first piezoelectric layer.

The first cavity may have a circular shape in a plan view.

Each of the motion pixels may include: a second support member on a second substrate; a second cavity including an empty space surrounded by the second support member; a second piezoelectric layer on the second cavity; a second lower electrode between the second piezoelectric layer and the second cavity; and a second upper electrode on the second piezoelectric layer.

The ultrasonic sensor may have a rectangular shape in a plan view, and the plurality of motion pixels may be spaced apart from the four sides of the rectangular shape by set intervals.

Each of the motion pixels may have any one of a circular shape, an elliptic shape, and a rectangular shape in a plan view.

A planar area of the second cavity may be larger than a planar area of the first cavity.

The display device may further include a main processor that determines a time difference of the reflected ultrasound received by the plurality of motion pixels. The time difference may be determined two or more times while the object is in motion, and the main processor may use the two or more time differences to determine the motion of the object.

The time difference may be determined by a difference between a first time and a second time. The first time may correspond to when the ultrasound is received by a first motion pixel at a left side of the ultrasonic sensor and the second time may correspond to when the ultrasound is received by a second motion pixel at a right side of the ultrasonic second. The first time may be shorter than the second time when the object is at a left side of the ultrasonic sensor, and the first time may be faster than the second time when the object is at the right side of the ultrasonic sensor. The main processor may determine the motion of the object in a first direction by utilizing the two or more time differences.

The sound generator may include a sound output unit for outputting an audible sound wave by vibrating the display panel, and an ultrasonic output unit for outputting an ultrasound by vibrating the display panel.

Other features and exemplary embodiments may be apparent from the following detailed description, the drawings, and the claims.

It is to be understood that both the foregoing general description and the following detailed description are exemplary and explanatory and are intended to provide further explanation of one or more embodiments of the present disclosure.

BRIEF DESCRIPTION OF THE DRAWINGS

The accompanying drawings, which are included to provide a further understanding of one or more embodiments of the present disclosure, and which are incorporated in and constitute a part of this specification, illustrate exemplary embodiments of the present disclosure, and together with the description serve to explain some of the embodiments of the present disclosure.

DETAILED DESCRIPTION

Figure 1:
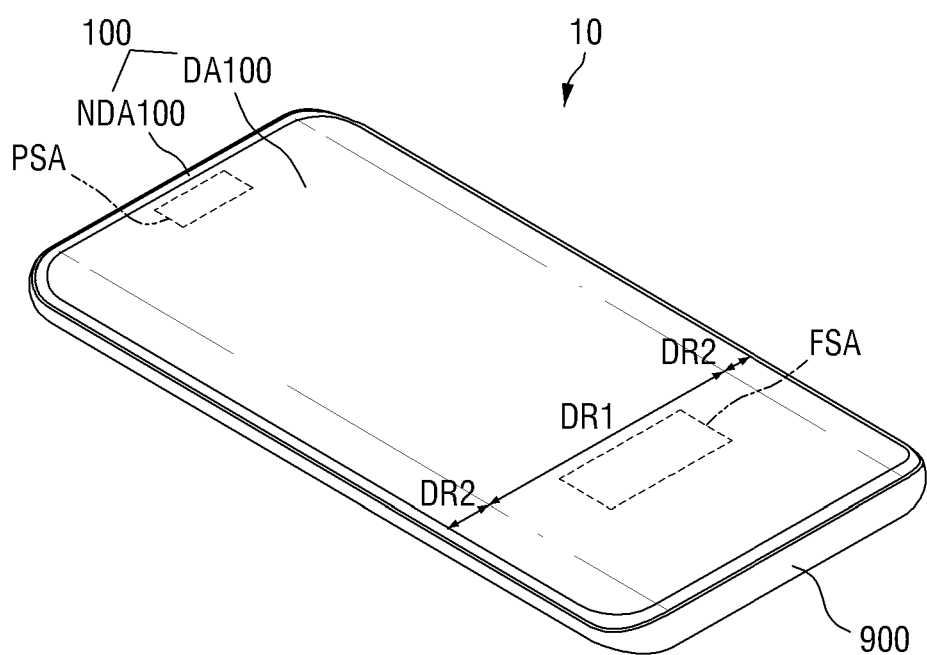
FIG. 1 is a perspective view of a display device according to an embodiment.

In the following description, for the purposes of explanation, numerous details are set forth in order to provide a thorough understanding of various exemplary embodiments and/or implementations of the present disclosure. As used herein, "embodiments" and "implementations" are interchangeable words that are non-limiting examples of embodiments or implementations of the present disclosure. It is apparent, however, that various exemplary embodiments may be practiced without these details or with one or more equivalent arrangements. In other examples, generally available structures and devices are shown in block diagram form in order to avoid unnecessarily obscuring various exemplary embodiments. Further, various exemplary embodiments may be different, but do not have to be exclusive. For example, shapes, configurations, and characteristics of an exemplary embodiment may be used or implemented in another exemplary embodiment without departing from the present disclosure.

Unless otherwise specified, the illustrated exemplary embodiments are to be understood as providing exemplary features of varying amounts of detail of some ways in which the present disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the present disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, except as otherwise provided. Further, in the accompanying drawings, the size and relative sizes of elements may be exaggerated for clarity and/or for descriptive purposes. When an exemplary embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," "attached to," or "coupled to" another element or layer, it may be directly on, connected to, attached to, or coupled to the other element or layer or intervening elements or layers may be present. When, however, an element or layer is referred to as being "directly on," "directly connected to," "directly attached to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular (e.g., substantially perpendicular) to one another, or may represent different directions that are not perpendicular (e.g., substantially perpendicular) to one another. For the purposes of this disclosure, "at least one of X, Y, and Z" and "at least one selected from the group consisting of X, Y, and Z" may be construed as X only, Y only, Z only, or any suitable combination of two or more of X, Y, and Z, such as, for example, XYZ, XYY, YZ, and ZZ. As used herein, the term "and/or" includes any and all suitable combinations of one or more of the associated listed items.

Although the terms "first," "second," etc. may be used herein to describe various types or kinds of elements, these elements should not be limited by these terms. These terms are used to distinguish one element from another element. Thus, a first element discussed herein below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein may be interpreted accordingly.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as being limited to the illustrated shapes of regions, but are to include deviations in shapes that result from, for example, manufacturing. In this manner, regions illustrated in the drawings may be schematic in nature, and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. When the blocks, units, and/or modules are implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the present disclosure. Further, the blocks, units, and/or modules of some exemplary embodiments may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
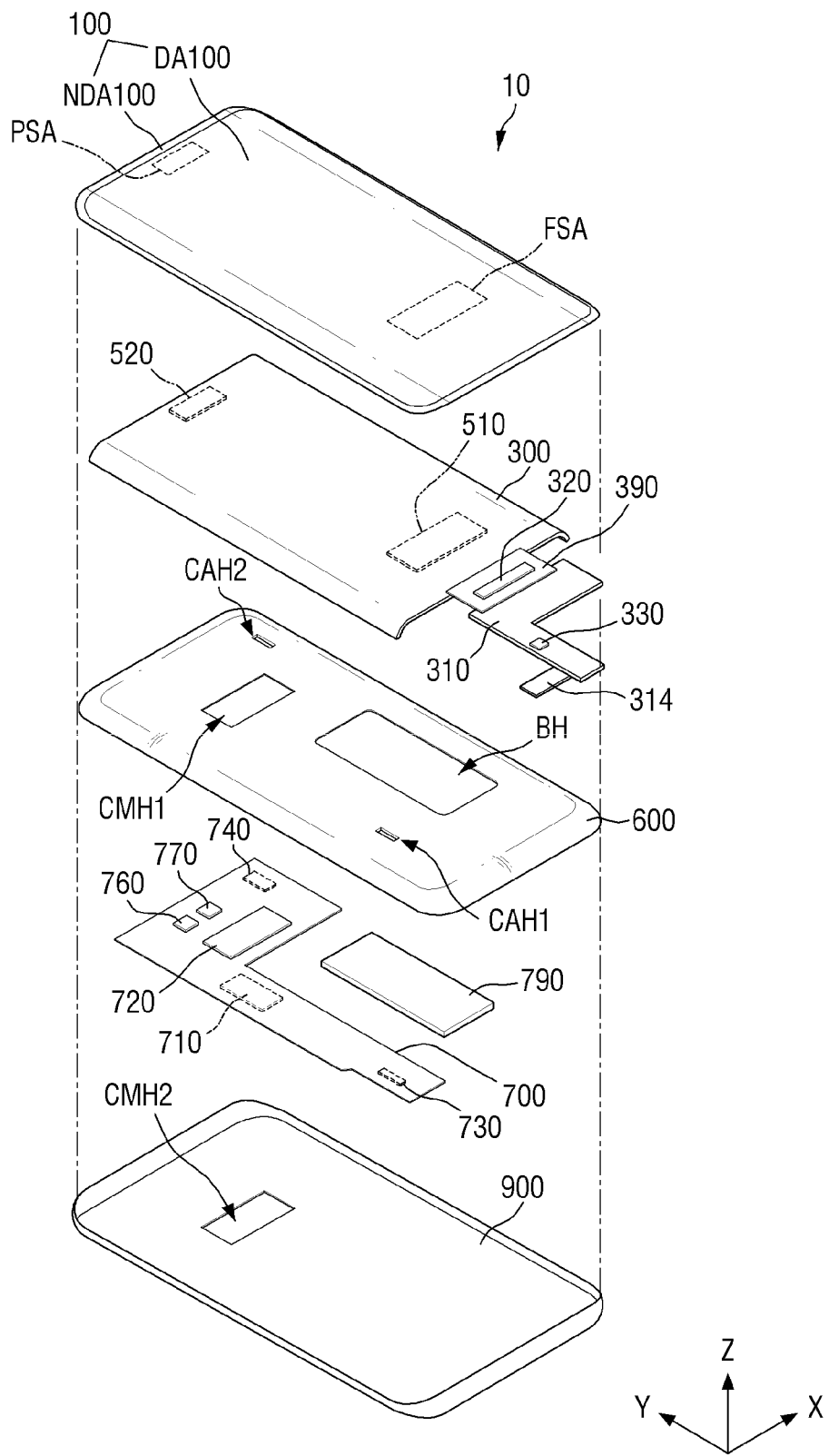
FIG. 2 is an exploded perspective view of a display device according to an embodiment.

FIG. 1 is a perspective view of a display device according to an embodiment, and FIG. 2 is an exploded perspective view of a display device according to an embodiment.

Referring to FIGS. 1 and 2, a display device 10 according to an embodiment includes a cover window 100, a display panel 300, a display circuit board 310, a display driving circuit 320, a flexible film 390, an ultrasonic sensor 510, a sound generator 520, a bracket 600, a main circuit board 700, and a lower cover 900.

In the present disclosure, the terms "on", "over", "upper side", or "upper surface" refer to a direction in which the cover window 100 is arranged, such as, for example, in a Z-axis direction, with respect to the display panel 300. The terms "beneath", "under", "lower side", or "lower surface" refer to a direction in which the bracket 600 is arranged, such as, for example, in a direction opposite to the Z-axis direction, with respect to the display panel 300. Further, the terms "left", "right", "top", and "bottom" refer to the horizontal directions of a plane when the display panel 300 is viewed from the Z-axis. For example, "left" refers to a direction opposite to an X-axis direction, "right" refers to the X-axis direction, "top" refers to the Y-axis direction, and "bottom" refers to a direction opposite to the Y-axis direction.

The display device 10, which is a device for displaying a moving image or a still image, may be used as a display screen for various suitable products such as, for example, televisions, notebooks, monitors, billboards, and internet of things, as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs.

The display device 10 may have a generally rectangular shape in a plan view. For example, as shown in FIGS. 1 and 2, the display device 10 may have a generally rectangular planar shape having short sides in a first direction (e.g., in the X-axis direction) and long sides in a second direction (e.g., in a Y-axis direction). The corner where the short side in the first direction meets the long side in the second direction may have a round shape of a set curvature or may have a right angle shape. However, the planar shape of the display device 10 is not limited to a rectangular shape, and may be other shapes, such as, for example, a polygonal shape, a circular shape, or an elliptical shape.

The display device 10 may include a first area DR1 that is flat and a second area DR2 extending from the right and left sides of the first area DR1. The second area DR2 may be flat or curved. When the second area DR2 is flat, the angle between the first area DR1 and the second area DR2 may be an obtuse angle. When the second area DR2 is curved, the second area DR2 may have a constant curvature or a variable curvature.

The display device 10 may include a sound output area PSA and a sensing area FSA. The sound output area PSA is defined as an area in which the sound generator 520 is disposed. A sound or an ultrasonic wave is outputted in the sound output area PSA. The sensing area FSA is defined as an area in which the ultrasonic sensor 510 is disposed. The ultrasonic wave is sensed in the sensing area FSA.

Although it is shown in FIG. 1 that the second area DR2 extends from the left and right sides of the first area DR1, embodiments of the present disclosure are not limited thereto. For example, the second area DR2 may extend from only one of the left and right sides of the first area DR1. For another example, the second area DR2 may extend from only one of the top and bottom sides of the first area DR1 and from only one of the left and right sides of the first area DR1. Hereinafter, it is assumed that the second area DR2 is along the left and right edges of the display device 10.

The cover window 100 may be on the display panel 300 so as to cover the upper surface of the display panel 300. Thus, the cover window 100 may function to protect the upper surface of the display panel 300.

The cover window 100 may be at the first area DR1 and the second areas DR2. The cover window 100 may include a light transmitting area DA100 corresponding to the display panel 300 and a light blocking area NDA100 corresponding to an area other than the display panel 300. The light transmitting area DA100 may be at the first area DR1 and the second areas DR2. The light blocking area NDA100 may be opaque. In some embodiments, the light blocking area NDA100 may be a decorative layer having a pattern that can be seen by a user when an image is not displayed.

The display panel 300 may be under the cover window 100. The display panel 300 may overlap the light transmitting area 100DA of the cover window 100. The display panel 300 may be at the first area DR1 and the second areas DR2. Thus, the image of the display panel 300 may be seen at the first area DR1 and also at the second areas DR2 through the cover window 100. For example, the image of the display panel 300 may be seen from the upper surface and left and right edges of the display device 10 through the cover window 100.

The display panel 300 may be a light emitting display panel including a light emitting element. For example, the display panel 300 may be an organic light emitting display panel that uses an organic light emitting diode that includes an organic light emitting layer. The display panel 300 may be an ultra-micro light emitting diode display panel that uses an ultra-micro light emitting diode (ultra-micro LED). The display panel 300 may be a quantum dot light emitting diode display panel that uses a quantum dot light emitting diode that includes a quantum dot light emitting layer. The display panel 300 may be an inorganic light emitting display panel that uses an inorganic light emitting diode that includes an inorganic semiconductor. Hereinafter, it is assumed that the display panel 300 is an organic light emitting display panel.

The display circuit board 310 and the display driving circuit 320 may be attached to one side of the display panel 300. One end of the display circuit board 310 may be attached onto pads provided on one side of the display panel 300 using an anisotropic conductive film. The display circuit board 310 may be a flexible printed circuit board, a rigid printed circuit board that is not easily bent, or a composite printed circuit board including both the flexible printed circuit board and the rigid printed circuit board.

The display driving circuit 320 receives control signals and power supply voltages through the display circuit board 310 and generates and outputs signals and voltages for driving the display panel 300. The display driving circuit 320 may be an integrated circuit and may be attached onto the display panel 300 using a chip on glass (COG) connection, a chip on plastic (COP) connection, or an ultrasonic connection, but the embodiments of the present disclosure are not limited thereto. For example, the display driving circuit 320 may be attached onto the display circuit board 310.

A touch driving circuit 330 and a first sound driver 760 may be on the display circuit board 310. The touch driving circuit 330 may be an integrated circuit and may be attached to the upper surface of the display circuit board 310. The touch driving circuit 330 may be connected to the touch electrodes of a touch sensor layer of the display panel 300 through the display circuit board 310. The touch driving circuit 330 may apply touch driving signals to driving electrodes among the touch electrodes. The touch driving circuit 330 may sense the charge variations of capacitances between the driving electrodes and the sensing electrodes through the sensing electrodes from among the touch electrodes, thereby outputting touch data that includes the user's touch coordinates. For example, the touch driving circuit 330 may use the sensing electrodes to sense the charge variations of capacitances between the driving electrodes and the sensing electrodes. Further, a power supply unit that supplies display driving voltages to drive the display driving circuit 320 may be on the display circuit board 310.

One side of the flexible film 390 may be attached to the upper surface of the display panel 300 at the bottom side of the display panel 300 with (e.g., by using) an anisotropic conductive film. The other side of the flexible film 390 may be attached to the upper surface of the display circuit board 310 at the top side of the display circuit board 310 through an anisotropic conductive film. The flexible film 390 may be a film that can be bent.

In some embodiments, the flexible film 390 may be omitted, and the display circuit board 310 may be directly attached to one side of the display panel 300. In this embodiment, one side of the display panel 300 may be bent toward the lower surface of the display panel 300.

The ultrasonic sensor 510 and the sound generator 520 may be on the lower surface of the display panel 300. For example, each of the ultrasonic sensor 510 and the sound generator 520 may be attached to the lower surface of the display panel 300 with (e.g., by using) an adhesive member such as, for example, a pressure sensitive adhesive.

In some embodiments, the ultrasonic sensor 510 and the sound generator 520 may be integrated with the display panel 300. For example, a buffer film 302 may be on the ultrasonic sensor 510 and the sound generator 520, and a substrate SUB1 of the display panel 300, shown in FIG. 4, may be omitted.

In some embodiments, a part of the ultrasonic sensor 510 and a part of the sound generator 520 may be integrated with the display panel 300. For example, as shown in FIG. 5, an ultrasonic detection device of the ultrasonic sensor 510 and an ultrasonic detection device of the sound generator 520 may be integrated with each other, and an ultrasonic emission device of the ultrasonic sensor 510 and an ultrasonic emission device of the sound generator 520 may be attached to the lower surface of the display panel 300 with (e.g., by using) an adhesive member such as, for example, a pressure sensitive adhesive. The ultrasonic detection device of the ultrasonic sensor 510 and the ultrasonic detection device of the sound generator 520 may be between the substrate SUB1 and the buffer film 302 of the display panel 300, shown in FIG. 4. The ultrasonic emission device of the ultrasonic sensor 510 and the ultrasonic emission device of the sound generator 520 may be on the lower surface of the substrate SUB1 of the display panel 300.

The ultrasonic sensor 510 may be adjacent to (e.g., aligned with or near to) the bottom side of the display panel 300, and the sound generator 520 may be adjacent to the top side of the display panel 300. However, the position of the ultrasonic sensor 510 and the position of the sound generator 520 are not limited to those shown in FIG. 2. Each of the ultrasonic sensor 510 and the sound generator 520 may be at an area not overlapping the display circuit board 310 bent toward the lower surface of the display panel 300, a cable 314, and a first camera hole CMH1 and a battery hole BH of the bracket 600. The ultrasonic sensor 510 may be an ultrasonic fingerprint recognition sensor for recognizing a user's fingerprint. The sound generator 520 may be a receiver for outputting a voice of a counterpart in the call mode or a speaker for outputting music of the counterpart in the music playback mode. However, the ultrasonic sensor 510 and the sound generator 520 are not limited to an ultrasonic fingerprint recognition sensor, a receiver, or a speaker. For example, they may be a proximity sensor and a motion sensor that perform other functions of emitting ultrasounds and sensing ultrasounds reflected by a user or an object.

The bracket 600 may be under the display panel 300. The bracket 600 may include plastic, metal, or both plastic and metal. The bracket 600 may have a first camera hole CMH1 in which a camera device 720 is positioned, a battery hole BH in which a battery is positioned, a first cable hole CAH1 through which a cable 314 connected to the display circuit board 310 passes, and a second cable hole CAH2 through which a cable 531 connected to a sound circuit board 530 passes.

The main circuit board 700 and a battery 790 may be under the bracket 600. The main circuit board 700 may be a printed circuit board or a flexible printed circuit board.

The main circuit board 700 may include a main processor 710, a camera device 720, a main connector 730, and a sound connector 740. The camera device 720 may be on both the upper surface and lower surface of the main circuit board 700. The main processor 710, a first sound driver 760, and a second sound driver 770 may be on the upper surface of the main circuit board 700, and the main connector 730 and the sound connector 740 may be on the lower surface of the main circuit board 700.

The main processor 710 may control some or all of the functions of the display device 10. For example, the main processor 710 may output digital video data to the display driving circuit 320 through the display circuit board 310 such that the display panel 300 displays an image. Further, the main processor 710 may receive touch data from the touch driving circuit 330, determine the touch position of a user, and then execute an application indicated by an icon displayed at the touch position of the user. Further, the main processor 710 may receive touch data from the touch driving circuit 330, and may execute an application indicated by an icon displayed at the touch coordinate of the user according to the touch data.

The camera device 720 may process an image frame, such as, for example, a still image or a moving image obtained by an image sensor of the camera device 720. The camera device 720 may further output (e.g., send or transmit) the image frame to the main processor 710.

The cable 314 passing through the first cable hole CAH1 of the bracket 600 may be connected to the main connector 730. Thus, the main circuit board 700 may be electrically connected to the display circuit board 310.

The cable 531 passing through the second cable hole CAH2 of the bracket 600 may be connected to the sound connector 740. Thus, the main circuit board 700 may be electrically connected to the sound circuit board 530.

The battery 790 may not overlap the main circuit board 700 in the third direction (Z-axis direction). The battery 790 may overlap the battery hole BH of the bracket 600.

The main circuit board 700 may further include a mobile communication module capable of transmitting and receiving a radio signal to/from at least one of a base station, an external terminal, and a server. The radio signal may include various types or kinds of data depending on a voice signal, a video call signal, or a text/multimedia message transmission/reception.

The lower cover 900 may be under the main circuit board 700 and under the battery 790. The lower cover 900 may be connected (e.g., fixed, attached, etc.) to the bracket 600. The lower cover 900 may provide a lower surface appearance of the display device 10. The lower cover 900 may include plastic and/or metal.

The lower cover 900 may include a second camera hole CMH2 through which the camera device 720 is exposed. The position of the camera device 720 and the position of the first camera hole CMH1 corresponding to the camera device 720 are not limited to the embodiment shown in FIG. 2.

Figure 3:
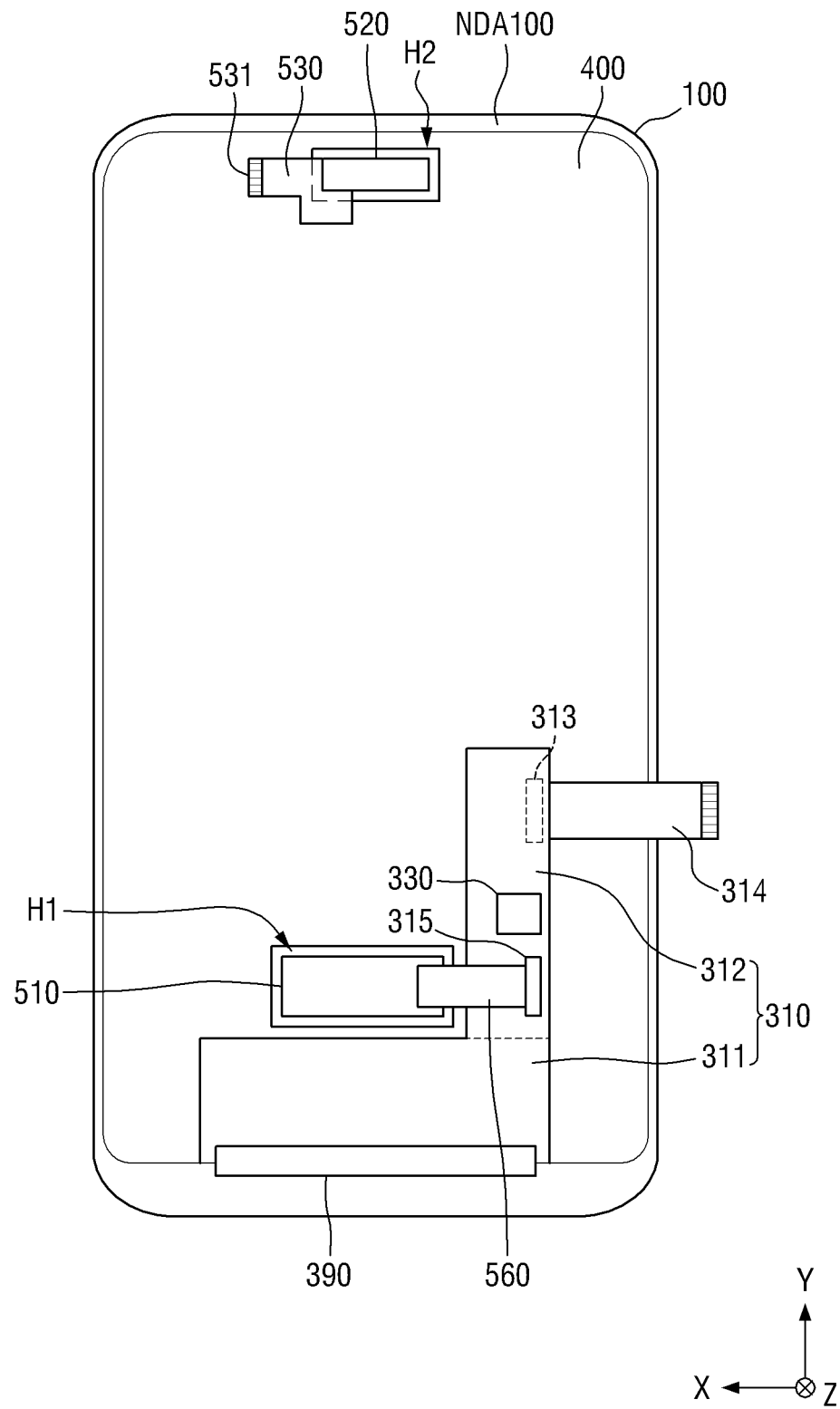
FIG. 3 is a rear view showing an example of a display panel attached to the cover window of FIG. 2.

FIG. 3 is a lower view showing an example of a display panel attached to the cover window of FIG. 2.

Referring to FIG. 3, the panel lower member 400 may be under the display panel 300. The panel lower member 400 may be attached to the lower surface of the display panel 300 with (e.g., by using) an adhesive member. The adhesive member may be a pressure sensitive adhesive (PSA).

The panel lower member 400 may include at least one of a light absorbing member configured to absorb light incident from the outside, a buffer member configured to absorb an external impact, and a heat radiation member configured to efficiently radiate heat of the display panel 300.

The light absorbing member may be under the display panel 300. The light absorbing member inhibits or reduces the transmission of light to prevent components under the light absorbing member, such as, for example, a display circuit board 310, an ultrasonic sensor 510, and a sound generator 520, and the like from being viewed from above the display panel 300, or may reduce the visibility of these components from above the display panel 300. The light absorbing member may include a light absorbing material such as a black pigment and/or a dye.

The buffer member may be under the light absorbing member. The buffer member absorbs an external impact to reduce damage to the display panel 300. The buffer member may be a single layer or a plurality of layers. For example, the buffer member may include a polymer resin such as polyurethane, polycarbonate, polypropylene, and/or polyethylene, and/or may include an elastic material such as a rubber, a urethane material, or a sponge such as, for example, foamed acrylic material. The buffer member may be a cushion layer.

The heat radiation member may be under the buffer member. The heat radiation member may include a first heat radiation layer, including graphite and/or carbon nanotubes, and a second heat radiation layer that is capable of blocking electromagnetic waves and is a metal thin film of copper, nickel, ferrite and/or silver having excellent thermal conductivity.

In some embodiments, the panel lower member 400 may be omitted. In such embodiments, the components on the lower surface of the panel lower member 400, such as, for example, the display circuit board 310, may be on the lower surface of the display panel 300 instead of the lower surface of the panel lower member 400.

The flexible film 390 attached to one side of the display panel 300 may be bent as shown in FIG. 3, and may be under the panel lower member 400. Therefore, the display circuit board 310 attached to one side of the flexible film 390 may be under the panel lower member 400. The display circuit board 310 may be fixed or attached (e.g., connected) to the lower surface of the panel lower member 400 by a fixing (e.g., connecting) member, such as, for example, a screw.

The display circuit board 310 may include a first circuit board 311 and a second circuit board 312. Each of the first circuit board 311 and the second circuit board 312 may be a rigid printed circuit board or a flexible printed circuit board. When either one of the first circuit board 311 and the second circuit board 312 is a rigid printed circuit board and the other one is a flexible printed circuit board, the display circuit board 310 may be a composite printed circuit board.

It is illustrated in FIG. 3 that the second circuit board 312 extends from one side of the first circuit board 311 in the second direction (Y-axis direction). The width of the second circuit board 312 in the first direction (X-axis direction) may be smaller than the width of the first circuit board 311 in the first direction (X-axis direction).

The touch driving circuit 330 and a second connector 315 may be on one surface of the second circuit board 312, and a first connector 313 may be on the other surface of the second circuit board 312. The first connector 313 may include an insertion portion connected to (e.g., that receives) a first connection terminal at one end of the cable 314. The second connector 315 may include an insertion portion connected to (e.g., that receives) a connection terminal provided at one end of a first flexible circuit board 560.

The first connection terminal provided at one end of the cable 314 may be inserted into the insertion portion of the first connector 313. As shown in FIGS. 2 and 3, the second connection terminal provided at the other end of the cable 314 may be bent toward the lower portion of the main circuit board 700 through the first cable hole CAH1 in the bracket 600, and may be inserted into the insertion portion of the main connector 730.

The ultrasonic sensor 510 may be in the first hole H1 that is in the panel lower member 400 and that exposes the display panel 300. The ultrasonic sensor 510 may be attached to the lower surface of the display panel 300 with (e.g., by using) an adhesive member, such as a pressure sensitive adhesive.

The sound generator 520 may be in the second hole H2 that is in the panel lower member 400 and that exposes the display panel 300. The sound generator 520 may be attached to the lower surface of the display panel 300 with (e.g., using) an adhesive member, such as a pressure sensitive adhesive.

The connection terminal provided at one end of the first flexible circuit board 560 may be inserted into the insertion portion of the second connector 315. The other end of the first flexible circuit board 560 may be connected to the ultrasonic sensor 510. For example, the other end of the first flexible circuit board 560 may be attached to pads on the lower surface of the ultrasonic sensor 510 with an anisotropic conductive film.

The sound generator 520 may be connected to the sound circuit board 530. For example, one end of the sound circuit board 530 may be connected to pad electrodes on at least one side of the sound generator 520.

The sound circuit board 530 may be connected to the sound connector 740 of the main circuit board 700 by the second cable hole CAH2 of the bracket 600. Thus, the sound generator 520 may be connected to the first sound driver 760 and second sound driver 770 of the main circuit board 700. Therefore, the sound generator 520 may vibrate according to the first driving voltage and the second driving voltage of the first sound driver 760 to output a sound. Further, the sound generator 520 may vibrate according to the third driving voltage and the fourth driving voltage of the second sound driver 770 to output ultrasounds.

The bracket 600 may include a battery hole BH, a first cable hole CAH1, a second cable hole CAH2, and a first camera hole CMH1. Because the battery hole BH is a hole for accommodating (e.g., containing) a battery, the battery 790 may overlap the battery hole BH along the third direction (Z-axis direction) as shown in FIG. 2. The size of the battery hole BH may be larger than the size of the battery 790. Because the first camera hole CMH1 of the bracket 600 is a hole for accommodating the camera device 720 of the main circuit board 700, the camera device 720 may overlap the first camera hole CMH1 along the third direction (Z-axis direction).

According to the embodiment shown in FIG. 3, the ultrasonic sensor 510 may be on the lower surface of the display panel 300, and may be electrically connected to the display circuit board 310 by the first flexible circuit board 560. The main circuit board 700 and the display circuit board 310 may be electrically connected to each other by the cable 314. The sound generator 520 may be electrically connected to the main circuit board 700 by the sound circuit board 530. Therefore, the ultrasonic sensor 510 and the sound generator 520 may be electrically connected to the main circuit board 700.

Figure 4:
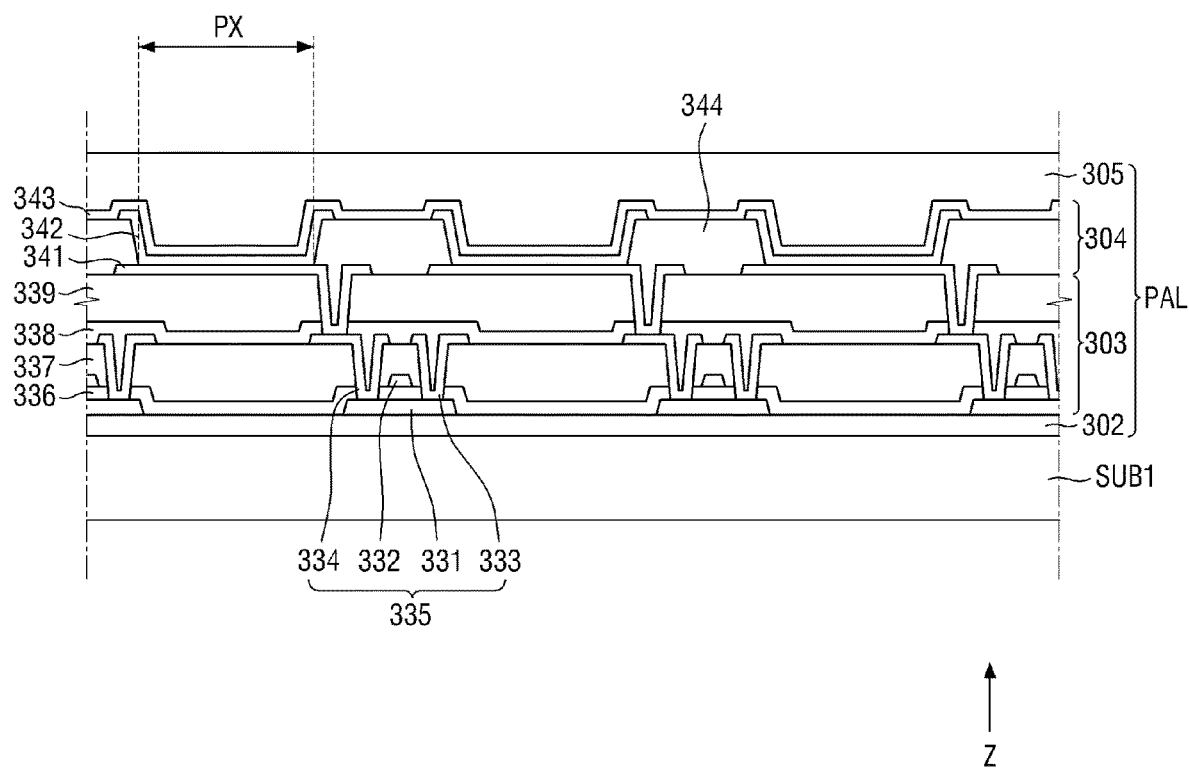
FIG. 4 is a cross-sectional view showing an example of a display area of the display panel of FIG. 2.
Figure 5:
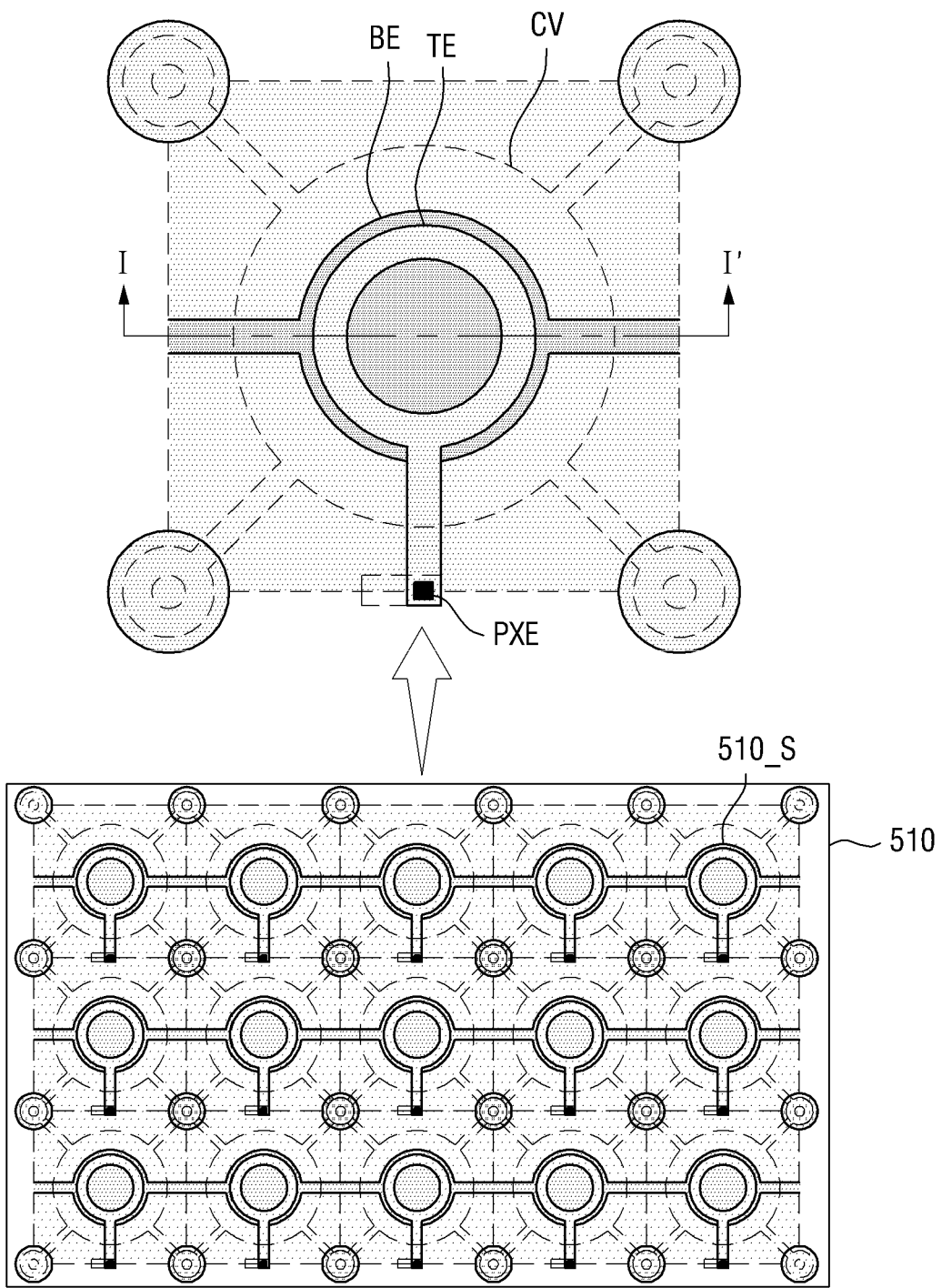
FIG. 5 includes plan views showing an example of the ultrasonic detection device of FIG. 3.

FIG. 4 is a cross-sectional view showing an example of a display area of the display panel of FIG. 2.

Referring to FIG. 4, the display panel 300 may include a substrate SUB1 and a pixel array layer PAL. The pixel array layer PAL may include a buffer film 302, a thin film transistor layer 303, a light emitting element layer 304, and a thin film encapsulation layer 305, as shown in FIG. 4.

The substrate SUB1 may be plastic or glass. The buffer film 302 may be on the substrate SUB1. The buffer film 302 may protect the thin film transistors 335 and the light emitting elements, which are vulnerable to moisture, from moisture penetrating through the substrate SUB1. The buffer film 302 may be a plurality of alternately laminated inorganic films. For example, the buffer film 302 may be a multi-layer film in which one or more inorganic layers, including one or more of a silicon oxide (SiOx), a silicon nitride (SiNx), and a silicon oxynitride (SiON), are alternately stacked. In some embodiments, the buffer film 302 may be omitted.

The thin film transistor layer 303 may be on the buffer film 302. The thin film transistor layer 303 may include thin film transistors 335, a gate insulating film 336, an interlayer insulating film 337, a protective film 338, and a planarization film 339.

Each of the thin film transistors 335 includes an active layer 331, a gate electrode 332, a source electrode 333, and a drain electrode 334. Although it is shown in FIG. 4 that the thin film transistors 335 have a top gate arrangement in which the gate electrode 332 is on the active layer 331, embodiments of the present disclosure are not limited thereto. For example, the thin film transistors 335 may have a bottom gate arrangement in which the gate electrode 332 is under the active layer 331. In some embodiments, the thin film transistors 335 may have a double gate arrangement in which the gate electrode 332 is both on and beneath the active layer 331.

The active layer 331 may be on the buffer film 302. The active layer 331 may be a silicon-based semiconductor material or an oxide-based semiconductor material. A light blocking layer for blocking external light incident on the active layer 331 may be between the buffer film 302 and the active layer 331.

The gate insulating film 336 may be on the active layer 331. The gate insulating film 336 may be an inorganic film, such as, for example, a silicon oxide (SiOx) film, a silicon nitride (SiNx) film, or a multi-layer film thereof.

The gate electrode 332 and a gate line may be on the gate insulating film 336. The gate electrode 332 and the gate line may be a single layer structure or a multi-layer structure including at least one of molybdenum (Mo), aluminum (Al), chromium (Cr), gold (Au), titanium (Ti), nickel (Ni), neodymium (Nd) and copper (Cu), or an alloy thereof.

The interlayer insulating film 337 may be on the gate electrode 332 and the gate line. The interlayer insulating film 337 may be an inorganic film, such as, for example, a silicon oxide (SiOx) film, a silicon nitride (SiNx) film, or a multi-layer film thereof.

The source electrode 333, the drain electrode 334, and a data line may be on the interlayer insulating film 337. Each of the source electrode 333 and the drain electrode 334 may be connected to the active layer 331 through a contact hole in the gate insulating film 336 and in the interlayer insulating film 337. The source electrode 333, the drain electrode 334, and the data line may be a single layer structure or a multi-layer structure including at least one of molybdenum (Mo), aluminum (Al), chromium (Cr), gold (Au), titanium (Ti), nickel (Ni), neodymium (Nd) and copper (Cu), or an alloy thereof.

The protective film 338 that insulates the thin film transistor 335 may be on the source electrode 333, the drain electrode 334, and the data line. The protective film 338 may be an inorganic film, for example, a silicon oxide (SiOx) film, a silicon nitride (SiNx) film, or a multi-layer film thereof.

The planarization film 339 that flattens a step caused by the thin film transistor 335 may be on the protective film 338. The planarization film 339 may include an organic film including an acryl resin, an epoxy resin, a phenolic resin, a polyamide resin, and/or a polyimide resin.

The light emitting element layer 304 may be on the thin film transistor layer 303. The light emitting element layer 304 may include light emitting elements and a pixel defining film 344.

The light emitting elements and the pixel defining film 344 may be on the planarization film 339. The light emitting element may be an organic light emitting element including an anode electrode 341, a light emitting layer 342, and a cathode electrode 343.

The anode electrode 341 may be on the planarization film 339. The anode electrode 341 may be connected to the drain electrode 334 of the thin film transistor 335 through a contact hole in the protective film 338 and in the planarization film 339.

The pixel defining film 344 may be on the planarization film 339 and may cover the edge of the anode electrode 341 so as to define pixels PX. For example, the pixel defining film 344 serves to define pixels PX. Each of the pixels PX may include an area where the anode electrode 341, the light emitting layer 342, and the cathode electrode 343 are sequentially arranged, and where holes from the anode electrode 341 and electrons from the cathode electrode 343 are combined with each other in the light emitting layer 342 to emit light.

The light emitting layers 342 may be on the anode electrode 341 and the pixel defining film 344. The light emitting layers 342 may be organic light emitting layers. In some embodiments, the light emitting layer 342 may emit one selected from red light, green light, and blue light. In some embodiments, the light emitting layer 342 may be a white light emitting layer that emits white light. When the light emitting layer 342 is a white light emitting layer, the light emitting layer 342 may have a laminate structure of a red light emitting layer, a green light emitting layer, and a blue light emitting layer, and may be a common layer in the pixels PX. In this embodiment, the display panel 300 may further include separate color filters for displaying red, green, and blue colors.

The light emitting layer 342 may include a hole transporting layer, a light emitting layer, and an electron transporting layer. Further, the light emitting layer 342 may have a tandem structure of two stacks or more, and in this embodiment, a charge generating layer may be between the stacks.

The cathode electrode 343 may be on the light emitting layer 342. The cathode electrode 343 may cover the light emitting layer 342. The cathode electrode 343 may be a common layer in the pixels PX.

Although the light emitting element layer 304 has been described as having a top emission arrangement, in which light is emitted in an upward direction, the embodiments of the present disclosure are not limited thereto. For example, the light emitting element layer 304 may have a bottom emission arrangement in which light is emitted in a downward direction (e.g., in a direction opposite to the Z-axis). When the light emitting element layer 304 has a top emission arrangement, in which light is emitted upward, the anode electrode 341 may be a high-reflectance metal material such as, for example, a laminate structure (Ti/Al/Ti) of aluminum and titanium, a laminate structure (ITO/Al/ITO) of aluminum and ITO, an APC alloy, or a laminate structure (ITO/APC/ITO) of an APC alloy and indium tin oxide (ITO). The APC alloy may be an alloy of silver (Ag), palladium (Pd), and copper alloy (Cu). The cathode electrode 343 may be a transparent conductive material (TCO) such as, for example, ITO or IZO, which is light-transmissive, or a semi-transmissive conductive material such as, for example, magnesium (Mg), silver (Ag), or an alloy of magnesium (Mg) and silver (Ag). When the cathode electrode 343 is a semi-transmissive conductive material, light emission efficiency may be increased by microcavities.

The thin film encapsulation layer 305 may be on the light emitting element layer 304. The thin film encapsulation layer 305 serves to prevent or reduce the permeation of oxygen or moisture into the light emitting layer 342 and the cathode electrode 343. The thin film encapsulation layer 305 may include at least one inorganic film. The inorganic film may include silicon nitride, aluminum nitride, zirconium nitride, titanium nitride, hafnium nitride, tantalum nitride, silicon oxide, aluminum oxide, and/or titanium oxide. The thin film encapsulation layer 305 may further include at least one organic film. The organic film may have a sufficient thickness to prevent or reduce the penetration of foreign matter (particles) through the thin film encapsulation layer 305 and into the light emitting layer 342 and the cathode electrode 343. The organic film may include any one of epoxy, acrylate, and/or urethane acrylate.

A touch sensor layer may be on the thin film encapsulation layer 305. When the touch sensor layer is directly on the thin film encapsulation layer 305, the thickness of the display device 10 may be reduced compared to when a separate touch panel is on (e.g., attached onto) the thin film encapsulation layer 305. The touch sensor layer may include touch electrodes that sense a touch of a user in a capacitance manner (e.g., by sensing the capacitance between the touch electrodes), and touch lines for connecting the pads and the touch electrodes. For example, the touch sensor layer may sense a user's touch by a self-capacitance manner or a mutual capacitance manner.

FIG. 5 is a plan view showing an example of the ultrasonic detection device of FIG. 3.

Referring to FIG. 5, the ultrasonic sensor 510 may include a plurality of ultrasonic sensor units 510_S. According to an embodiment, the ultrasonic sensor units 510_S may be arranged in an M*N matrix form. In this embodiment, each of M and N may be a natural number of greater than 1. The ultrasonic sensor units 510_S may be electrically coupled to each other by a common lower (reference) electrode BE. Each upper electrode TE may be a driving/sensing electrode at the center of the ultrasonic sensor unit 510_S, and may be individually coupled to (e.g., connected to) a related (e.g., corresponding) sensor pixel circuit by an individual pixel input electrode PXE.

Figure 6A:
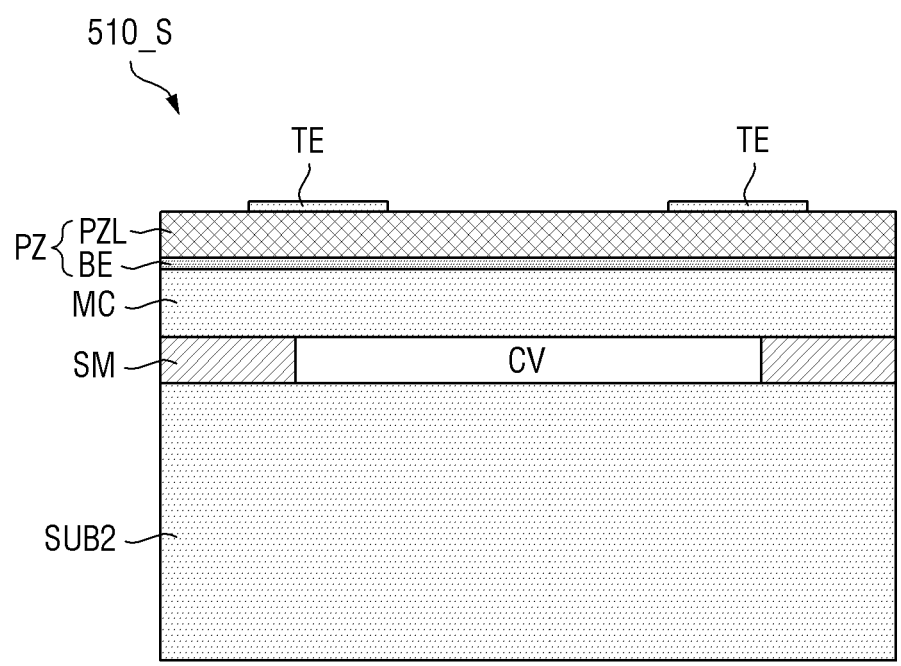
FIGS. 6A and 6B are cross-sectional views of the ultrasonic detection device taken along the line I-I' of FIG. 5.
Figure 6B:
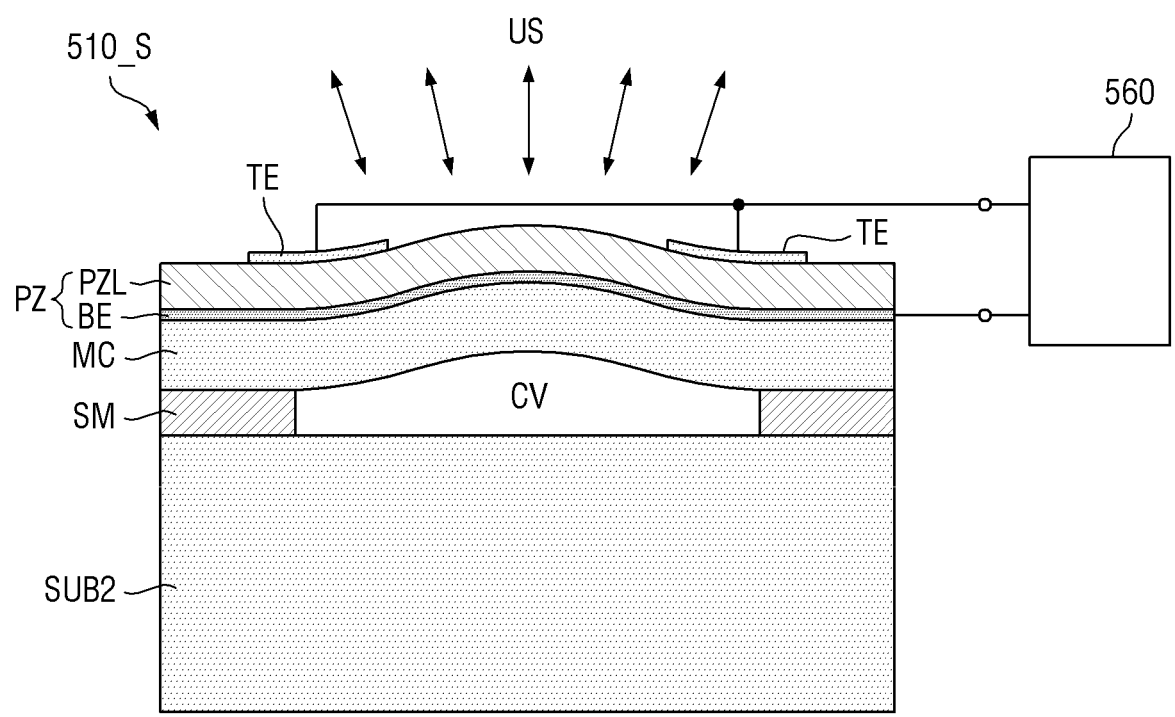

FIGS. 6A and 6B are cross-sectional views of the ultrasonic detection device taken along the line I-I' of FIG. 5.

Referring to FIG. 6A, the ultrasonic sensor unit 510_S may include a piezoelectric layer stack PZ and a mechanical layer MC, which are supported by (e.g., are on) a support member SM and on a cavity CV. The piezoelectric layer stack PZ includes a piezoelectric layer PZL, a lower electrode BE, and an upper electrodes TE. In an exemplary embodiment, the lower electrode BE is under the piezoelectric layer PZL and adjacent to the cavity CV, whereas the upper electrode TE may be on the piezoelectric layer PZL and adjacent to the surface of the piezoelectric layer PZL facing the cavity CV. The cavity CV may be in the substrate SUB2 or on the substrate SUB2. For example, the cavity CV may be in the support member SM, and the support member may be on the substrate SUB2. The substrate SUB2 may be a silicon wafer, a silicon-on-insulator (SOI) wafer, a silicon or SOI wafer having an integrated circuit, a semiconductor wafer, or a glass or polymer wafer having a thin film transistor, or may include any suitable combination of these wafers. In some embodiments, the substrate SUB2 may be a flexible substrate, such as, for example, a thin layer of polyimide (PI), polyethylene naphthalate (PEN), and/or polyethylene terephthalate (PET), and/or may be a flexible substrate having an InGaZnO (IGZO) circuit.

Referring to FIG. 6B, during operation (e.g., operation of the flexible circuit board 560), the piezoelectric layer stack PZ and the mechanical layer MC may be bent and vibrated in response to the time-varying excitation voltage applied to both ends of the upper electrode TE and the lower electrode BE by the first flexible circuit board 560. As a result of the bending and vibrating of the piezoelectric layer stack PZ and the mechanical layer MC, for example, one or more pressure ultrasounds US having frequencies in the ultrasonic frequency band may be propagated into a propagation medium. Examples of the propagation medium may include air, cover glass, and a device enclosure. Similarly, the piezoelectric layer stack PZ may receive pressure ultrasounds US reflected from an object OBJ in the propagation medium, and may convert the received pressure ultrasounds US into electrical signals that may be read by the first flexible circuit board 560. Because the piezoelectric layer stack PZ and the mechanical layer MC on the cavity CV may be bent and vibrated in response to the reflected pressure ultrasounds US colliding on (e.g., with) the surface of the ultrasonic sensor 510, surface charges on the surfaces of the piezoelectric layer stack PZ, which may be detected by an underlying circuit, and mechanical stresses and deformations of the piezoelectric layer stack PZ and the mechanical layer MC may be generated. For example, the lower electrode BE may be grounded, or may be connected to a constant bias voltage (for example, a reference voltage).

According to an embodiment, an array of the ultrasonic sensor units 510_S may operate in modes corresponding to multiple frequency ranges. In some embodiments, for example, the array of the ultrasonic sensor units 510_S may operate in a low-frequency mode corresponding to a low-frequency band (for example, 50 kHz to 200 kHz) or in a high-frequency mode corresponding to a high-frequency band (for example, 1 MHz to 25 MHz). When the array of the ultrasonic sensor units 510_S operates in the high-frequency mode, the array of ultrasonic sensor units 510_S may be capable of imaging with a relatively high resolution. Therefore, the array of ultrasonic sensor units 510_S may be capable of detecting touch, fingerprint, and biometric information from an object (for example, fingers) on the surface of a display or sensor array. As used herein, the high-frequency mode may be referred to as a fingerprint sensor mode.

When the array of the ultrasonic sensor units 510_S operates in the low-frequency mode, the array of ultrasonic sensor units 510_S may emit sound waves capable of penetration into (e.g., propagation through) air, which is relatively intense compared to when the array of the ultrasonic sensor units 510_S operates in the high-frequency mode. Such low-frequency sound waves may be transmitted through cover glass, a touch screen, a display array, a backlight, a housing or enclosure, or other layers between an ultrasonic transmitter and the surface of a display or a sensor array. The relatively low-frequency sound waves may be transmitted through air on the surface of a display or a sensor array, reflected from one or more objects near the surface thereof, and transmitted again through air and layers over the air, and detected by a receiver of the ultrasonic sensor 510. Accordingly, when the array of the ultrasonic sensor units 510_S operates in the low-frequency mode, the array of ultrasonic sensor units 510_S may be capable of operating in a gesture detection mode. Thus, gestures near the display may be detected.

Figure 7:
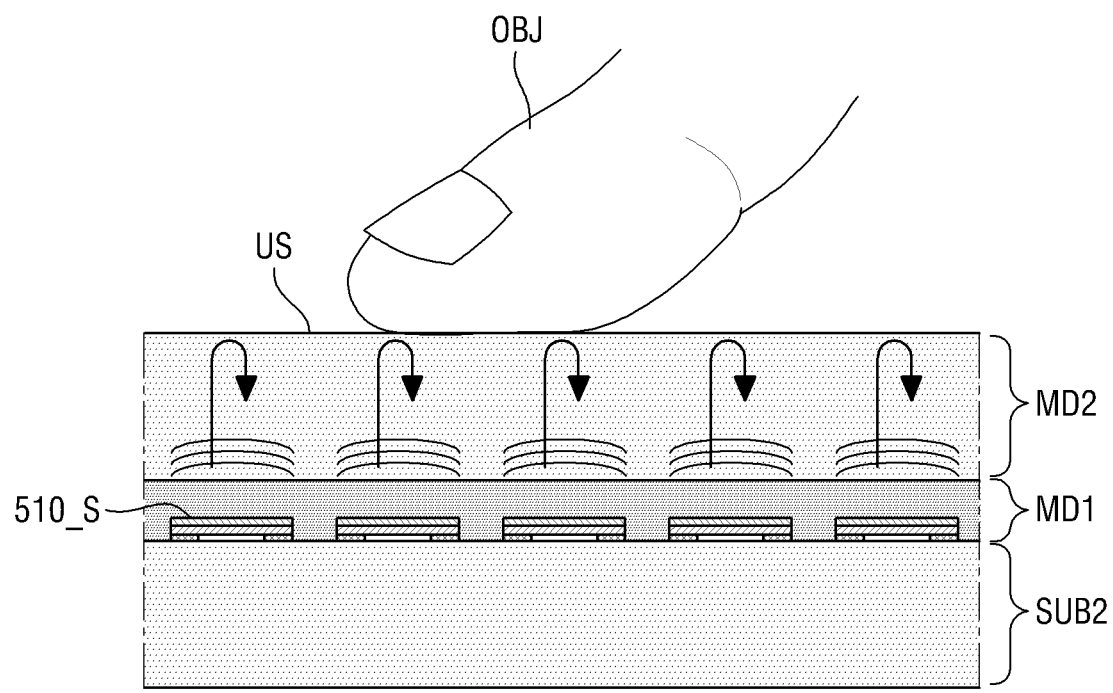
FIG. 7 is a cross-sectional view showing an ultrasonic sensing method of the ultrasonic detection device.

FIG. 7 is an exemplary view showing an ultrasonic sensing method of the ultrasonic detection device.

Referring to FIG. 7, the plurality of ultrasonic sensor units 510_S on the substrate SUB2 of the ultrasonic sensor 510 may emit and detect ultrasounds US. As illustrated, an ultrasound US may be transmitted from at least one ultrasonic sensor unit 510_S. The ultrasound US may move toward an object OBJ, such as, for example, a finger located on the outer surface of a second sound propagation medium MD2, through a first sound propagation medium MD1 and the second sound propagation medium MD2. A part of the ultrasound US may be transmitted to the object OBJ through the second sound propagation medium MD2, while another part of the ultrasound US may be reflected from the surface of the second sound propagation medium MD2 toward the ultrasonic sensor units 510_S. The reflected ultrasound US may be detected by the ultrasonic sensor units 510_S, and an image of the object OBJ may be captured by the ultrasonic sensor units 510_S. For example, ridges and valleys of the fingerprint may be detected using sensor arrays, each having a pitch of 50 microns (about 500 pixels/inch). In order to improve the coupling between the ultrasonic sensor units 510_S and second sound propagation medium MD2 disposed on the substrate SUB2 of the ultrasonic sensor 510, the first sound propagation medium MD1 may include, for example, an adhesive, a gel, a compliant layer, and/or another sound coupling material. The first sound propagation medium MD1 may assist (e.g., improve) the transmission of ultrasounds US to the ultrasonic sensor units 510_S and the reception of ultrasounds US from the ultrasonic sensor units 510_S. The second sound propagation medium MD2 may include, for example, a layer of glass, plastic, sapphire, metal, metal alloy, and/or another platen material.

Figure 8:
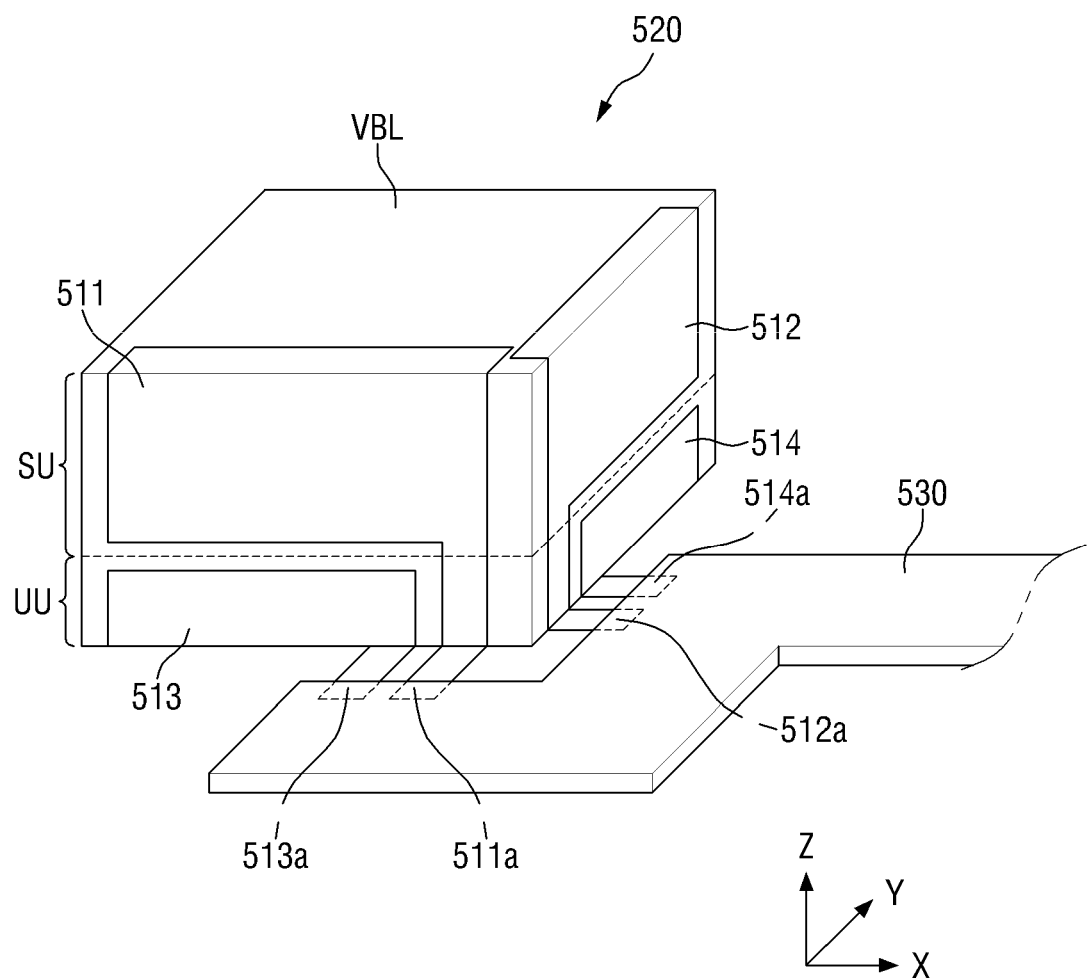
FIG. 8 is a perspective view showing an example of the sound generator of FIG. 3.
Figure 9:
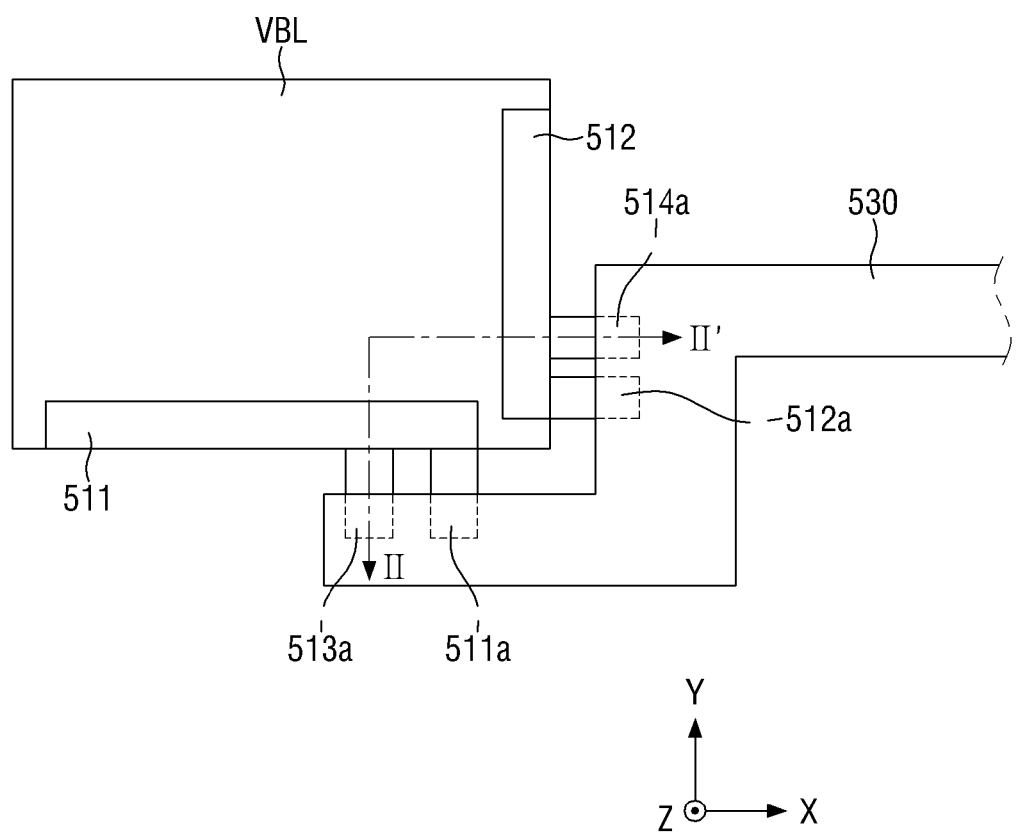
FIG. 9 is a plan view showing an example of the sound generator of FIG. 3.
Figure 10:
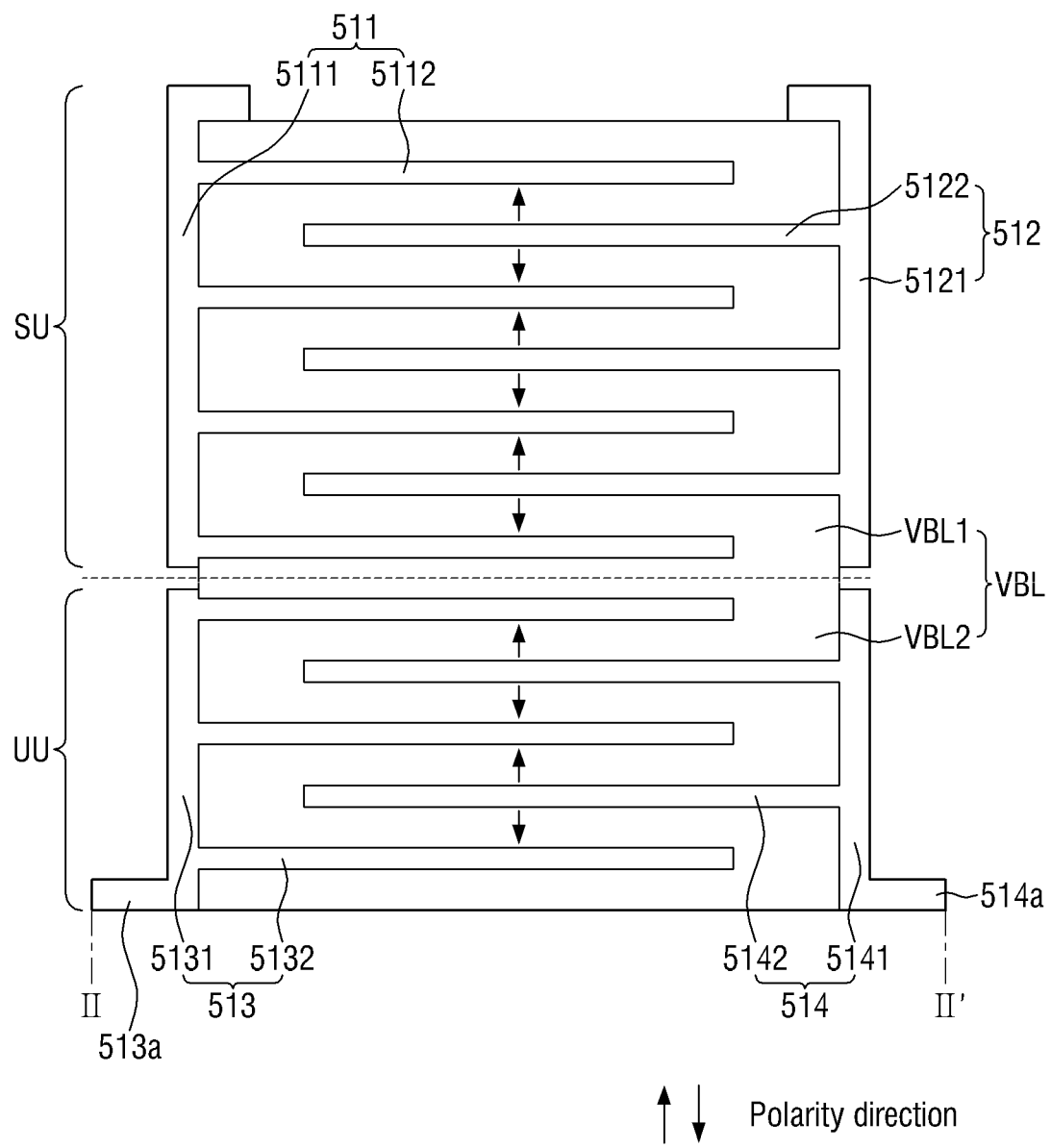
FIG. 10 is a cross-sectional view taken along the line II-II' of FIG. 9.

FIG. 8 is a perspective view showing an embodiment of the sound generator of FIG. 3, FIG. 9 is a plan view showing an embodiment of the sound generator of FIG. 3, and FIG. 10 is a cross-sectional view taken along the line II-II' of FIG. 9.

Referring to FIGS. 8 to 10, the sound generator 520 may include a sound output unit SU for vibrating the display panel 300 to output a sound, and an ultrasonic output unit UU for vibrating the display panel 300 to output an ultrasound US. However, the structure of the sound generator 520 is not limited thereto, and the sound generator 520 may include any one of the sound output unit SU and the ultrasonic output unit UU.

Although it is illustrated in FIGS. 8 to 10 that the sound output unit SU is at the upper portion of the sound generator 520 and the ultrasonic output unit UU is at the lower portion of the sound generator 520, the embodiments of the present disclosure are not limited thereto. For example, the sound output unit SU may be at the lower portion of the sound generator 520, and the ultrasonic output unit UU may be at the upper portion of the sound generator 520. In some embodiments, the sound output units SU may be at the lower and upper portions of the sound generator 520, respectively, and the ultrasonic output unit UU may be between the sound output units SU. For example, the ultrasonic output unit UU may be between the sound output units SU and may be at or near the center portion of the sound generator 520.

In FIGS. 8 to 10, the sound output unit SU and the ultrasonic output unit UU may be arranged in a line in a third direction (Z-axis direction). The third direction (Z-axis direction) may be a height direction of the sound generator 520 (or vibration layer VBL).

The sound output unit SU may include a first electrode 511, a second electrode 512, and a first vibration layer VBL1 of the vibration layer VBL. The ultrasonic output unit UU may include a third electrode 513, a fourth electrode 514, and a second vibration layer VBL2 of the vibration layer VBL.

The first electrode 511 may include a first stem electrode 5111 and first branch electrodes 5112. Although it is shown in FIG. 10 that the first stem electrode 5111 is on one side surface of the vibration layer VBL, the embodiments of the present disclosure are not limited thereto. For example, the first stem electrode 5111 may be on any one or more of the plurality of side surfaces of the vibration layer VBL. The first stem electrode 5111 may be on the upper surface of the vibration layer VBL. The first branch electrodes 5112 may be branched from the first stem electrode 5111. The first branch electrodes 5112 may be parallel (e.g., substantially parallel) to each other.

The second electrode 512 may include a second stem electrode 5121 and second branch electrodes 5122. Although it is shown in FIG. 10 that the second stem electrode 5121 is on another side surface of the vibration layer VBL than the side surface of the vibration layer VBL that the first stem electrode 5111 is on, the embodiments of the present disclosure are not limited thereto. For example, the second stem electrode 5121 may be on any one or more of the plurality of side surfaces of the vibration layer VBL (e.g., any one or more of the plurality of side surfaces of the vibration layer VBL that the first stem electrode 5111 is not on). The second stem electrode 5121 may be on the upper surface of the vibration layer VBL. The second branch electrodes 5122 may be branched from the second stem electrode 5121. The second branch electrodes 5122 may be parallel (e.g., substantially parallel) to each other.

The first branch electrodes 5112 and the second branch electrodes 5122 may be parallel (e.g., substantially parallel) to each other in the horizontal direction (X-axis direction or Y-axis direction). Further, the first branch electrodes 5112 and the second branch electrodes 5122 may be alternately arranged in the third direction (Z-axis direction). For example, the first branch electrodes 5112 and the second branch electrodes 5122 may be repeatedly arranged in the third direction (Z-axis direction) in the order of the first branch electrode 5112, the second branch electrode 5122, the first branch electrode 5112, and the second branch electrode 5122. The horizontal direction (X-axis direction or Y-axis direction) may be a first width direction or a second width direction of the vibration layer VBL, and the third direction (Z-axis direction) may be a height direction of the vibration layer VBL.

The third electrode 513 may include a third stem electrode 5131 and third branch electrodes 5132. Although it is shown in FIG. 10 that the third stem electrode 5131 is on one side surface of the vibration layer VBL, the embodiments of the present disclosure are not limited thereto. For example, the third stem electrode 5131 may be on any of the plurality of side surfaces of the vibration layer VBL. For example, the third stem electrode 5131 may be on any one or more of the plurality of side surfaces of the vibration layer VBL that the first stem electrode 5111 is not on. For another example, the third stem electrode 5131 may be on the same side surface of the vibration layer VBL that the first stem electrode 5111 is on. The third branch electrodes 5132 may be branched from the third stem electrode 5131. The third branch electrodes 5132 may be parallel (e.g., substantially parallel) to each other.

The fourth electrode 514 may include a fourth stem electrode 5141 and fourth branch electrodes 5142. Although it is shown in FIG. 10 that the fourth stem electrode 5141 is on another side surface of the vibration layer VBL than the side surface of the vibration layer VBL that the third stem electrode 5131 is on, the embodiments of the present disclosure are not limited thereto. For example, the fourth stem electrode 5141 may be on any of the plurality of side surfaces of the vibration layer VBL. For example, the fourth stem electrode 5141 may be on any one or more of the plurality of side surfaces of the vibration layer VBL that the third stem electrode 5131 is not disposed. For another example, the fourth stem electrode 5141 may be on the same side surface of the vibration layer VBL on which the second stem electrode 5121 is on. The fourth branch electrodes 5142 may be branched from the fourth stem electrode 5141. The fourth branch electrodes 5142 may be parallel (e.g., substantially parallel) to each other.

The third branch electrodes 5132 and the fourth branch electrodes 5142 may be parallel (e.g., substantially parallel) to each other in the horizontal direction (X-axis direction or Y-axis direction). Further, the third branch electrodes 5132 and the fourth branch electrodes 5142 may be alternately arranged in the third direction (Z-axis direction). For example, the third branch electrodes 5132 and the fourth branch electrodes 5142 may be repeatedly arranged in the third direction (Z-axis direction) in the order of the third branch electrode 5132, the fourth branch electrode 5142, the third branch electrode 5132, and the fourth branch electrode 5142.

Because the vibration layer VBL may be formed at a high temperature, the first electrode 511, the second electrode 512, the third electrode 513, and the fourth electrode 514 may be silver (Ag) or an alloy of silver (Ag) and palladium (Pd), each having a high melting point. When the first electrode 511 and the second electrode 512 are an alloy of silver (Ag) and palladium (Pd), the content of silver (Ag) may be higher than the content of palladium (Pd).

A first pad electrode 511a may be connected to the first electrode 511. The first pad electrode 511a may protrude outward from the first stem electrode 5111 on one side surface of the vibration layer VBL.

A second pad electrode 512a may be connected to the second electrode 512. The second pad electrode 512a may protrude outward from the second stem electrode 5121 on another side surface of the vibration layer VBL.

A third pad electrode 513a may be connected to the third electrode 513. The third pad electrode 513a may protrude outward from the third stem electrode 5131 on one side surface of the vibration layer VBL.

A fourth pad electrode 514a may be connected to the fourth electrode 514. The fourth pad electrode 514a may protrude outward from the fourth stem electrode 5141 on another side surface of the vibration layer VBL.

The first pad electrode 511a, the second pad electrode 512a, the third pad electrode 513a, and the fourth pad electrode 514a may be connected to lead lines or pad electrodes of the sound circuit board 530. The lead lines or pad electrodes of the sound circuit board 530 may be on the lower surface of the sound circuit board 530.

As shown in FIG. 8, when the first pad electrode 511a and the third pad electrode 513a protrude from one side surface of the vibration layer VBL and the second pad electrode 512a and the fourth pad electrode 514a protrude from another side surface of the vibration layer VBL, the sound circuit board 530 may be on both one side surface and another side surface of the sound generator 520, but the embodiments of the present disclosure are not limited thereto. For example, the first pad electrode 511a, the second pad electrode 512a, the third pad electrode 513a, and the fourth pad electrode 514a may protrude from one side surface of the vibration layer VBL, and, in this embodiment, the sound circuit board 530 may be on one side surface of the sound generator 520.

The vibration layer VBL may be a piezoelectric actuator that is deformed in accordance with a first driving voltage applied to the first electrode 511, a second driving voltage applied to the second electrode 512, a third driving voltage applied to the third electrode 513, and a fourth driving voltage applied to the fourth electrode 514. In this embodiment, the vibration layer VBL may include any one of a piezoelectric material such as, for example, polyvinylidene fluoride (PVDF) or plumbum zirconate-titanate (PZT), and/or an electroactive polymer.

The vibration layer VBL may include a first vibration layer VBL1 and a second vibration layer VBL2. The first vibration layer VBL1 is a region of the vibration layer VBL corresponding to the sound output unit SU, and the second vibration layer VBL2 is a region of the vibration layer VBL corresponding to the ultrasonic output unit UU.

The first vibration layer VBL1 of the vibration layer VBL may be between the first branch electrodes 5112 and the second branch electrodes 5122. The first vibration layer VBL1 of the vibration layer VBL contracts or expands according to the difference between a first driving voltage applied to the first branch electrodes 5112 and a second driving voltage applied to the second branch electrodes 5122. The second vibration layer VBL2 of the vibration layer VBL may be between the third branch electrodes 5132 and the fourth branch electrodes 5142. The second vibration layer VBL2 of the vibration layer VBL contracts or expands according to the difference between a third driving voltage applied to the third branch electrodes 5132 and a fourth driving voltage applied to the fourth branch electrodes 5142.

Because the magnitude of a sound emitted by the sound output unit SU is proportional to the area of the sound output unit SU, in consideration of the magnitude of the sound of the sound output unit SU, the area of the first vibration layer VBL1 may be larger than the area of the second vibration layer VBL2. The number of first branch electrodes 5112 or the number of second branch electrodes 5122 may be larger than the number of third branch electrodes 5132 or the number of fourth branch electrodes 5142.

Figure 11A:
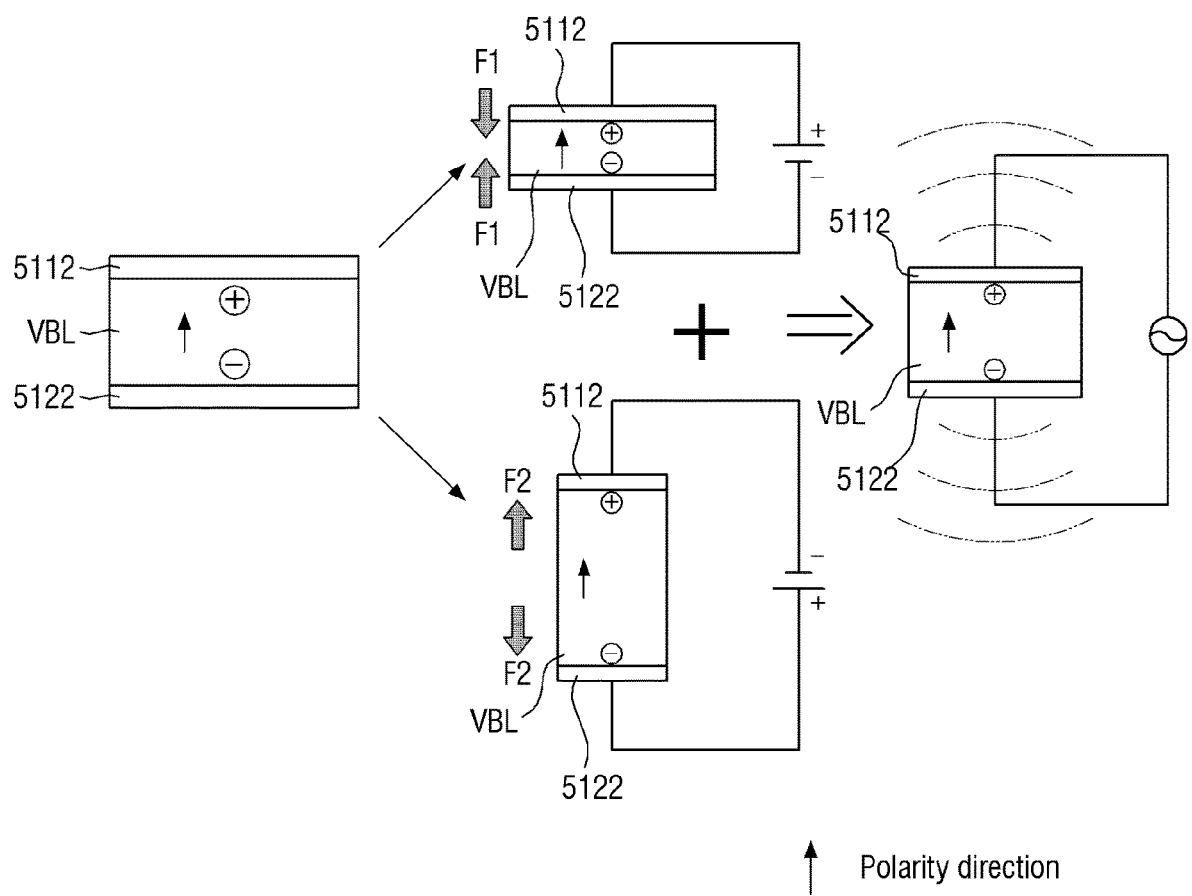
FIG. 11A is an exemplary view showing a method of vibrating a vibration layer between a first branch electrode and a second branch electrode of a sound generator.
Figure 11B:
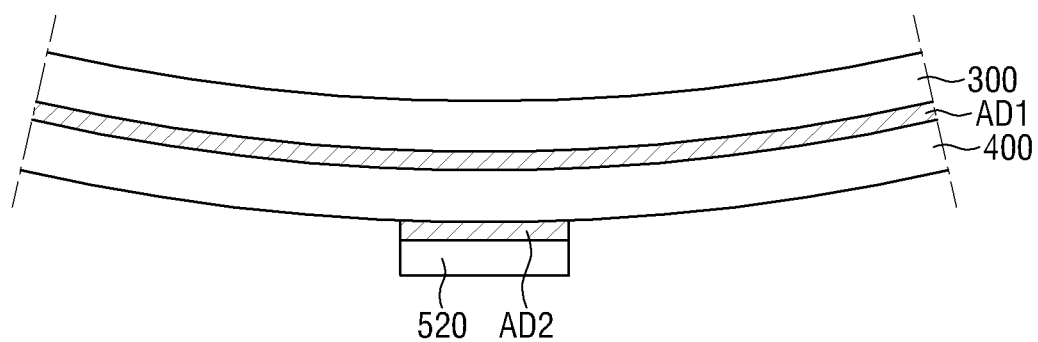
FIGS. 11B and 11C are exemplary views showing a method of vibrating a display panel using the vibration of a sound generator.
Figure 11B:
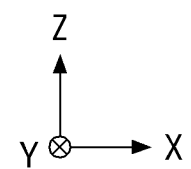
Figure 11C:
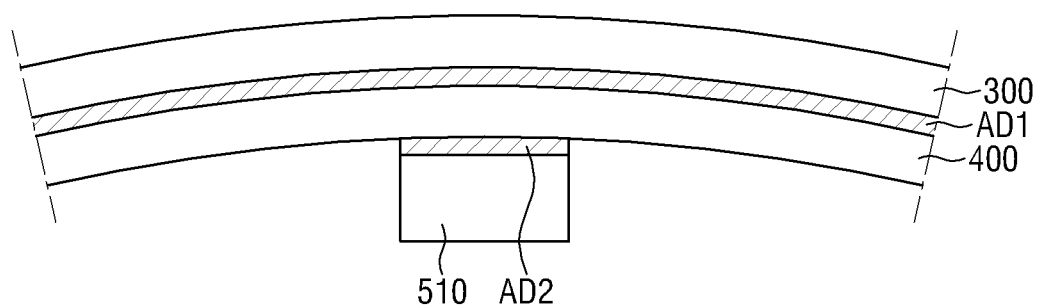
Figure 11C:
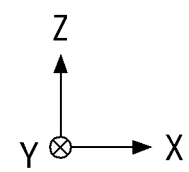

FIG. 11A is an exemplary view showing a method of vibrating a vibration layer between a first branch electrode and a second branch electrode of a sound generator, and FIGS. 11B and 11C are exemplary views showing a method of vibrating a display panel using the vibration of a sound generator.

Hereinafter, a method of vibrating the first vibration layer VBL1 of the vibration layer VBL will be described in more detail with reference to FIGS. 10 and 11A to 11C. Because a method of vibrating the second vibration layer VBL2 of the vibration layer VBL is substantially the same as the method of vibrating the first vibration layer VBL1 of the vibration layer VBL, a detailed description thereof will not be repeated here.

As shown in FIG. 10, the polar direction of the vibration layer VBL between the first branch electrode 5112 and the second branch electrode 5122 under the first branch electrode 5112 may be an upward direction (↑). In this embodiment, the vibration layer VBL has positive polarity in the upper region adjacent to the first branch electrode 5112, and has negative polarity in the lower region adjacent to the second branch electrode 5122. Further, the polar direction of the vibration layer VBL between the second branch electrode 5122 and the first branch electrode 5112 under the second branch electrode 5122 may be a downward direction (↓). In this embodiment, the vibration layer VBL has negative polarity in the upper region adjacent to the second branch electrode 5122, and has positive polarity in the lower region adjacent to the first branch electrode 5112. The polar direction of the vibration layer VBL may be determined by a poling process of applying an electric field to the vibration layer VBL using the first branch electrode 5112 and the second branch electrode 5122.

In FIG. 11A, the polar direction of the vibration layer VBL between the first branch electrode 5112 and the second branch electrode 5122 under the first branch electrode 5112 is the upward direction (↑). When a first driving voltage having positive polarity is applied to the first branch electrode 5112, and a second driving voltage having negative polarity is applied to the second branch electrode 5122, the vibration layer VBL may be contracted by a first force F1. The first force F1 may be a contraction force. Further, when a first driving voltage having negative polarity is applied to the first branch electrode 5112, and a second driving voltage having positive polarity is applied to the second branch electrode 5122, the vibration layer VBL may be expanded by a second force F2. The second force F2 may be an expansion force.

When the polar direction of the vibration layer VBL between the second branch electrode 5122 and the first branch electrode 5112 under the second branch electrode 5122 is the downward direction (↓), and when a first driving voltage having positive polarity is applied to the second branch electrode 5122, and a second driving voltage having negative polarity is applied to the first branch electrode 5112, the vibration layer VBL may be expanded by the expansion force. The second force F2 may be an expansion force. Further, when a first driving voltage having negative polarity is applied to the second branch electrode 5122, and a second driving voltage having positive polarity is applied to the first branch electrode 5112, the vibration layer VBL may be contracted by the contraction force. The first force F1 may be a contraction force.

According to the embodiment described with reference to FIG. 10, when the first driving voltage applied to the first electrode 511 and the second driving voltage applied to the second electrode 512 are alternately repeated in positive and negative polarities, the vibration layer VBL repeatedly contracts and expands, causing the sound generator 520 to vibrate.

Because the sound generator 520 is on the lower surface of the display panel 300, the display panel 300 is vibrated downward and upward, as shown in FIGS. 11B and 11C, when the vibration layer VBL of the sound generator 520 contracts and expands. Because the display panel 300 may be vibrated by the sound generator 520, the display device 10 may output a sound or an ultrasound. In one embodiment, the panel lower member 400 may be attached to the lower surface of the display panel 300 by a first adhesive layer AD1, and the sound generator 520 may be attached to the lower surface of the panel lower member 400 by a second adhesive layer AD2.

The first electrode 511 and second electrode 512 of the sound output unit SU may be connected to the first sound driver 760 through the sound circuit board 530, and receive the first driving voltage and the second driving voltage from the first sound driver 760. The third electrode 513 and fourth electrode 514 of the ultrasonic output unit UU may be connected to the second sound driver 770 through the sound circuit board 530, and receive the third driving voltage and the fourth driving voltage from the second sound driver 770.

The sound generator 520 may vibrate according to the first driving voltage and the second driving voltage, and the display panel 300 may vibrate up and down according to the vibration of the sound generator 520. According to an embodiment, the display device 10 may output an audible sound in a frequency band of 1 kHz to 20 kHz.

The ultrasonic output unit UU of the sound generator 520 may vibrate according to the third driving voltage and the fourth driving voltage, and the display panel 300 may vibrate up and down according to the vibration of the ultrasonic output unit UU of the sound generator 520. According to an embodiment, the display device 10 may output an ultrasound having a sound pressure level of 50 dB or more in a frequency band of 20 kHz or more and 200 kHz or less.

Hereinafter, a method of sensing a user's motion of the display device 10 through the ultrasonic sensor 510 and/or the sound generator 520 will be described in more detail with reference to FIGS. 12, 13A, and 13B.

Figure 12:
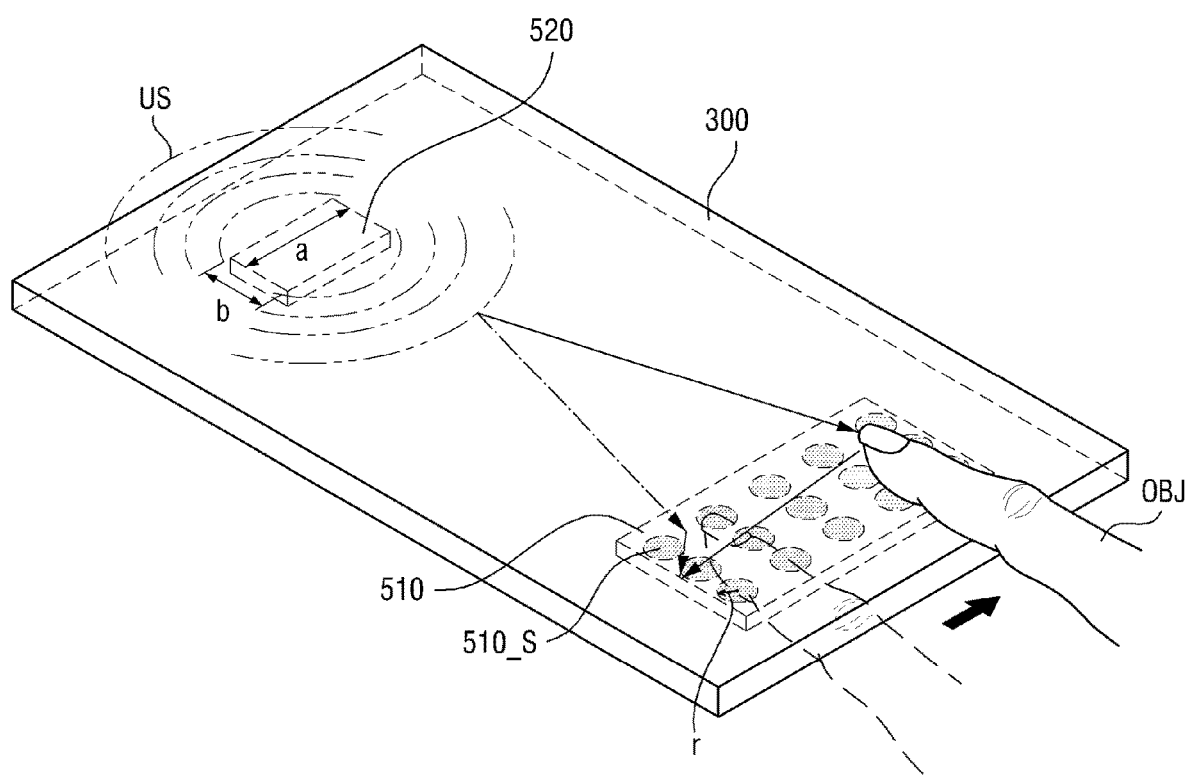
FIG. 12 is a perspective view showing a motion sensing method of an ultrasonic detection device according to an embodiment.
Figure 13A:
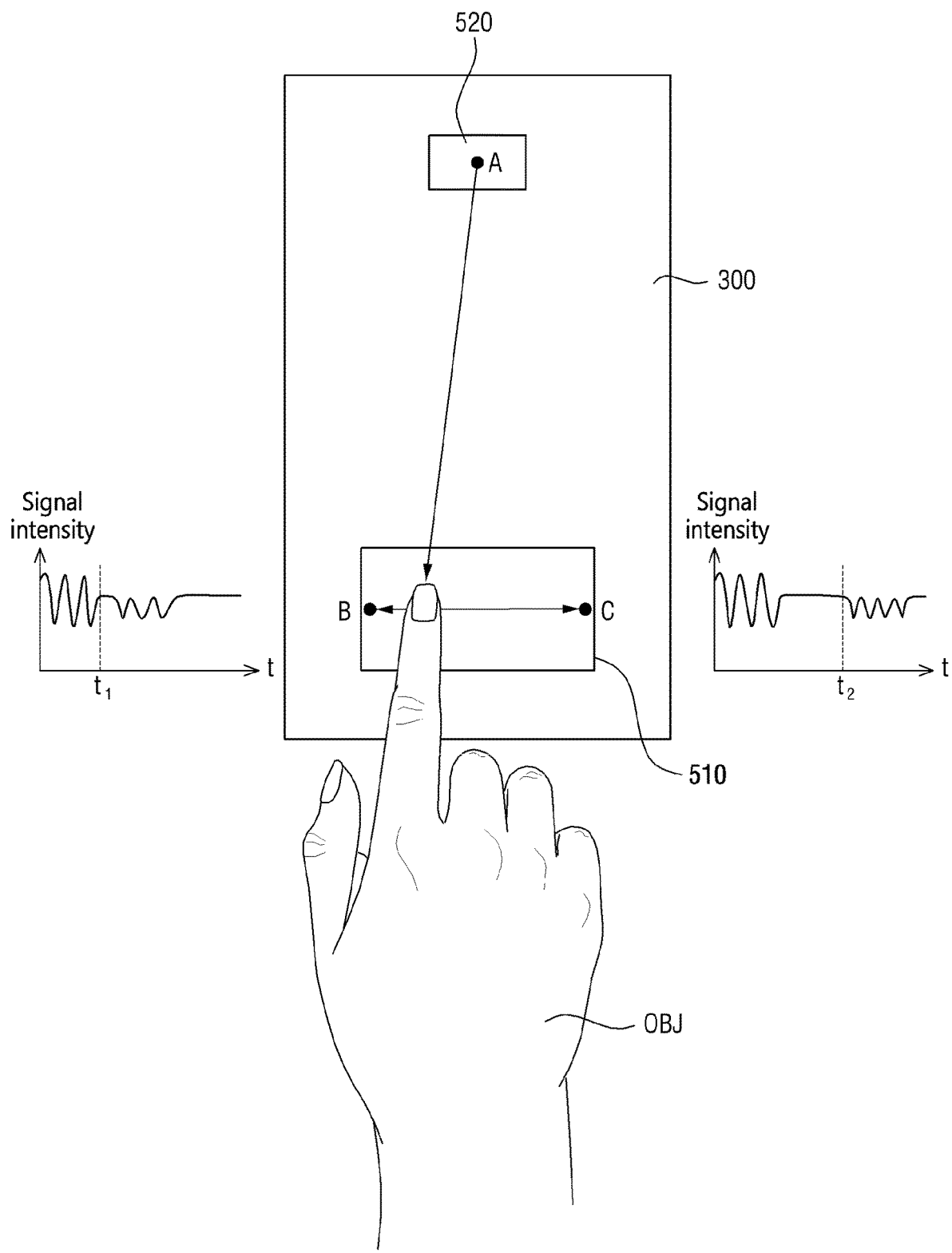
FIGS. 13A and 13B are plan views showing a motion sensing method of the ultrasonic detection device of FIG. 12.
Figure 13B:
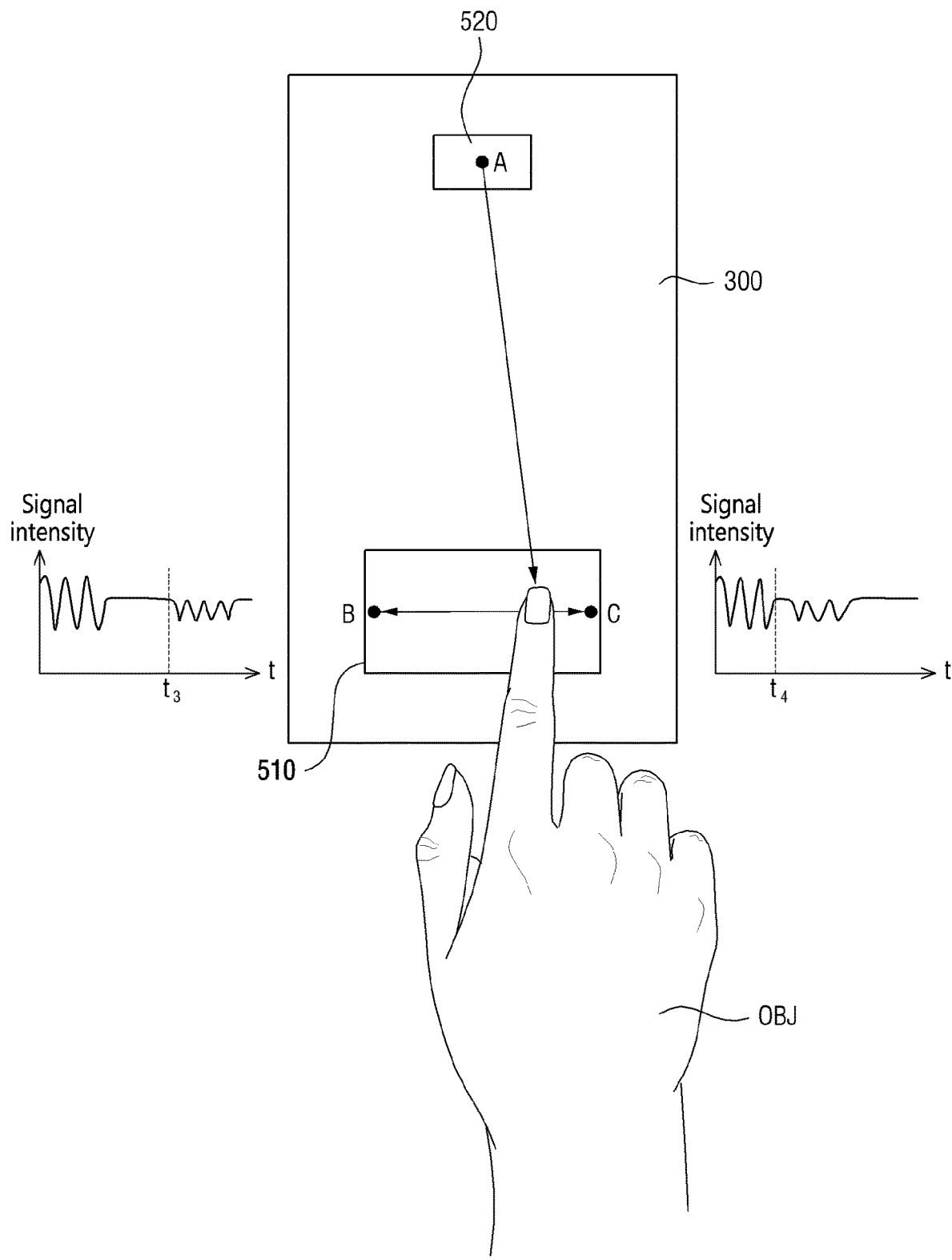

FIG. 12 is a perspective view showing a motion sensing method of an ultrasonic detection device according to an embodiment, and FIGS. 13A and 13B are plan views showing a motion sensing method of the ultrasonic detection device of FIG. 12.

Referring to FIG. 12, the ultrasonic sensor 510 and the sound generator 520 may be on the lower surface of the display panel 300. The ultrasonic sensor 510 may be at the center of the bottom side of the display panel 300, and the sound generator 520 may be at the center of the top side of the display panel 300.

As described herein above, the ultrasonic sensor 510 may operate in a low-frequency mode corresponding to a low-frequency band (for example, 50 kHz to 200 kHz) or a high-frequency mode corresponding to a high-frequency band (for example, 1 MHz to 25 MHz).

When operating in the high-frequency mode, the ultrasonic sensor 510 may output sensing voltages to a fingerprint reader. There is a time difference between when an ultrasound US reflects from the ridge of the fingerprint of a finger OBJ and when an ultrasound US reflects from the valley of the fingerprint of the finger OBJ. The fingerprint reader may generate a fingerprint pattern by using the sensing voltages reflecting the time difference. The fingerprint reader may determine whether the generated fingerprint pattern matches a pre-stored fingerprint pattern.

When operating in the low-frequency mode, the relatively low-frequency sound waves transmitted from the ultrasonic sensor 510 may propagate through air over the surface of the display panel 300, reflect from one or more objects (for example, the user's finger OBJ) near the surface of the display panel 300, and be detected by a receiver of the ultrasonic sensor 510 again. Thus, when operating in the low-frequency mode, the ultrasonic sensor 510 may be able to operate in the gesture detection mode of the user.

According to an embodiment, the ultrasonic sensor unit 510_S may have an output portion having a planar circular shape, and a radius of the circular output portion may be r. In this embodiment, the area of the circular output portion is $r^2\pi$. The sound generator 520 may have a planar rectangular output portion. When the width and length of the rectangular output portion are a and b, respectively, the area of the rectangular output portion is a*b. In this embodiment, when the radius r of the ultrasonic sensor unit 510_S has a value much smaller than the width a or length b of the sound generator 520, the area of the output portion of the ultrasonic sensor unit 510_S may be smaller than the area of the output portion of the sound generator 520, even if the radius r is multiplied by the circumference ratio π.

Because the magnitude of the sound is proportional to the area of the output portion, the intensity of the ultrasound US emitted from the ultrasonic sensor unit 510_S having a relatively small area compared to the planar area of the sound generator 520 may be weaker. Thus, the reception state of the ultrasonic sensor 510 may be good when a user touches a finger OBJ on the surface of the display panel 300 for fingerprint recognition. However, the reception state of the ultrasonic sensor 510 may not be good when the user swipes a finger OBJ or the like in a free space spaced apart from the display panel 300 to detect a gesture.

In some embodiments, the ultrasonic output unit UU of the sound generator 520 may output an ultrasound US having a sound pressure level of 50 dB or more in a frequency range of 20 kHz or more and 200 kHz or less. When the ultrasonic sensor 510 operates in the low-frequency mode, the ultrasonic sensor 510 may receive a sound wave in the low-frequency band (for example, 50 kHz to 200 kHz). Thus, the ultrasonic sensor 510 may receive and detect the ultrasound US output from the ultrasonic output unit UU of the sound generator 520. However, as described herein above, the sound generator 520 may not be structurally divided into the sound output unit SU and the ultrasonic output unit UU, and may output an audible sound wave (20 Hz to 20 kHz) and an ultrasound (20 kHz to 20 MHz).

Because the ultrasonic sensor 510 may receive and detect the ultrasound US output from the ultrasonic output unit UU of the sound generator 520, and because the sound generator 520 may have a greater output intensity of the ultrasound US than the ultrasonic sensor unit 510_S, the sound generator 520 may be set as a transmitter, and the ultrasonic sensor 510 may be set as a receiver, for when a gesture of the user's finger OBJ is to be detected. Therefore, the detection accuracy of the ultrasound US reflected by the object OBJ may be improved.

A method of sensing a user's motion will be described with reference to FIGS. 13A and 13B.

The main processor 710 may control the ultrasound US to be output (e.g., emitted) from the sound generator 520. For example, the main processor 710 may output (e.g., transmits) ultrasound data to the second sound driver 770. The second sound driver 770 may generate a third driving voltage and a fourth driving voltage according to the ultrasound data. The second sound driver 770 may transmit the third driving voltage and the fourth driving voltage to the third electrode 513 and fourth electrode 514, respectively, of the ultrasonic output unit UU of the sound generator 510 through the sound connector 740 and the sound circuit board 530.

The ultrasonic output unit UU of the sound generator 520 may vibrate according to the third driving voltage and the fourth driving voltage, and the display panel 300 may vibrate up and down according to the vibration of the ultrasonic output unit UU of the sound generator 520. Thus, the display device 10 may output an ultrasound having a sound pressure level of 50 dB or more in a frequency band of 20 kHz to 200 kHz.

Each of the plurality of ultrasonic sensor units 510_S detects the ultrasound US reflected by an object OBJ. For example, when the user's finger OBJ is at the left side of the ultrasonic sensor 510, the ultrasound US transmitted from one point A of the sound generator 520 may be reflected by the user's finger OBJ located on the left side of the ultrasonic sensor 510, and may be detected at one point B at the left side of the ultrasonic sensor 510 and at one point C at the right side of the ultrasonic sensor 510. In this embodiment, the time point t1 at which the ultrasound US is received at one point B at the left side of the ultrasonic sensor 510 is faster than the time point t2 at which the ultrasound US is received at one point C at the right side of the ultrasonic sensor 510. For example, the ultrasound US is received by the ultrasonic sensor 510 at point B before the ultrasound US is received at point C. In contrast, when the user's finger OBJ is at the right side of the ultrasonic sensor 510, the ultrasound US transmitted from one point A of the sound generator 520 may be reflected by the user's finger OBJ located on the right side of the ultrasonic sensor 510, and may be detected at one point B at the left side of the ultrasonic sensor 510 and at one point C at the right side of the ultrasonic sensor 510. In this embodiment, the time point t3 at which the ultrasound US is received at one point B at the left side of the ultrasonic sensor 510 is slower than the time point t4 at which the ultrasound US is received at one point C at the right side of the ultrasonic sensor 510. For example, the ultrasound US is received by the ultrasonic sensor 510 at point B after the ultrasound US is received at point C. Therefore, the main processor 710 may determine that the user's finger OBJ performs a swipe gesture from the left side to the right side, and, in response, may perform a preset or set operation in response to the gesture.

For convenience of explanation, although it is illustrated that the user's finger OBJ moves left and right, vertical movement, diagonal movement, and a gesture of drawing of a figure may also be detected through the ultrasonic sensor 510. Furthermore, although it is illustrated that only two time measurements are taken at each of point B and point C while the finger OBJ swipes from left to right, more than two time measurements may be taken.

Table 1 illustrates a driving algorithm of the ultrasonic sensor 510 and the sound generator 520.

TABLE 1

| Situations | | Sound generator | Ultrasonic sensor | | |
|---|---|---|---|---|---|
| | | Sound driving | Ultrasonic driving | Ultrasonic driving | Ultrasonic receiving |
| Call mode | Ear attached | Receiver | On | Off | On |
| | Ear not attached | | | | Proximity sensor: ear attachment or motion recognition |
| When driving music | | Speaker | On | Off | On Proximity sensor: Motion recognition |
| When not driving screen | | Off | On | Off | On Proximity sensor: Access recognition |
| When not driving screen and when recognizing touch | | Off | Off | On | On Fingerprint recognition |
| When driving screen | | Off | On | Off | On Proximity sensor: Motion recognition |

Referring to Table 1, the ultrasonic sensor 510 drives the ultrasonic transmitter only when fingerprint recognition is required or desired, and, otherwise, does not drive the ultrasonic transmitter. In contrast, the sound generator 520 does not drive the ultrasonic transmitter only when fingerprint recognition is required, and otherwise drives the ultrasonic transmitter. For example, the sound generator 520 drives the ultrasonic transmitter only when fingerprint recognition is not required or desired, and, otherwise, does not drive the ultrasonic transmitter.

Because the ultrasonic receiver of the ultrasonic sensor 510 is always driven, the ultrasonic receiver of the ultrasonic sensor 510 may always function as a proximity sensor in association with driving the ultrasonic transmitter of the sound generator 520, except when fingerprint recognition is required or desired. Thus, the ultrasonic sensor 510 may perform a motion recognition function or an access recognition function of the user in association with the sound generator 520.

Hereinafter, other embodiments will be described. In the following embodiments, the same features and configurations as the already described embodiments will be simplified or may not be repeated, and the differences will be mainly described.

Figure 14:
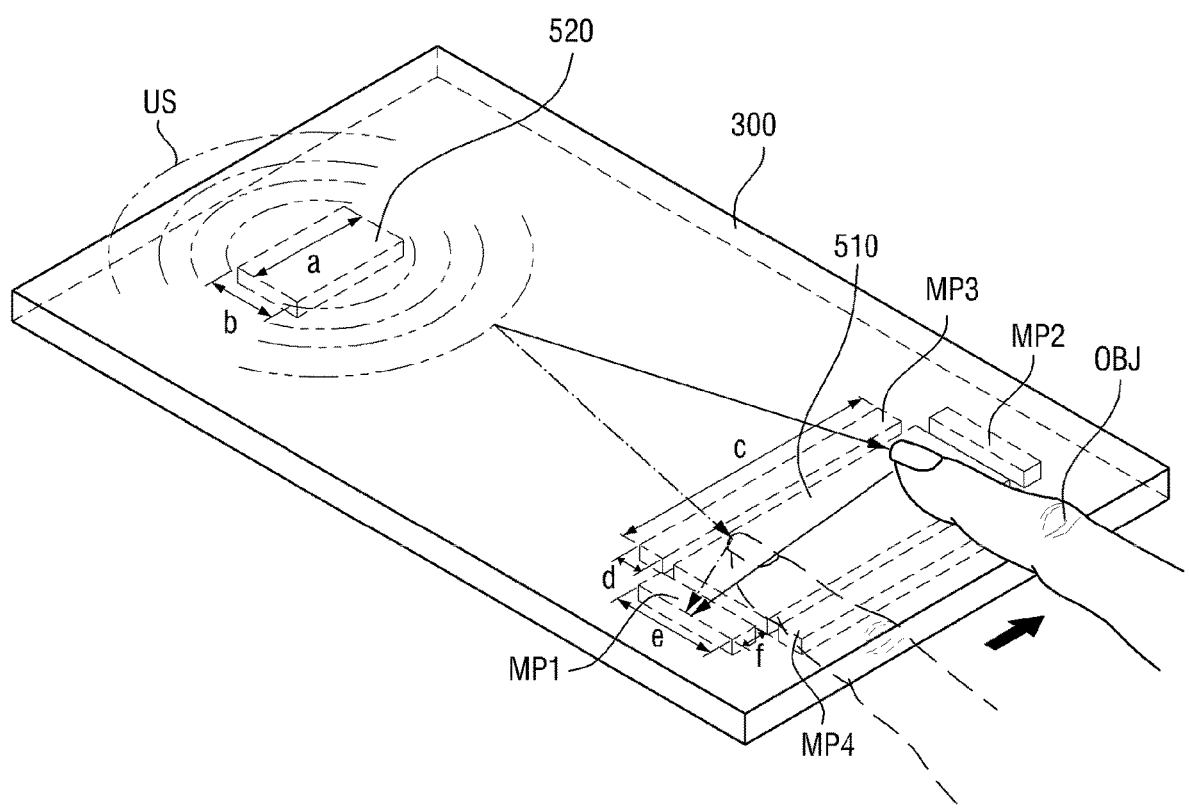
FIG. 14 is a perspective view showing a motion sensing method of an ultrasonic detection device according to another embodiment.
Figure 15A:
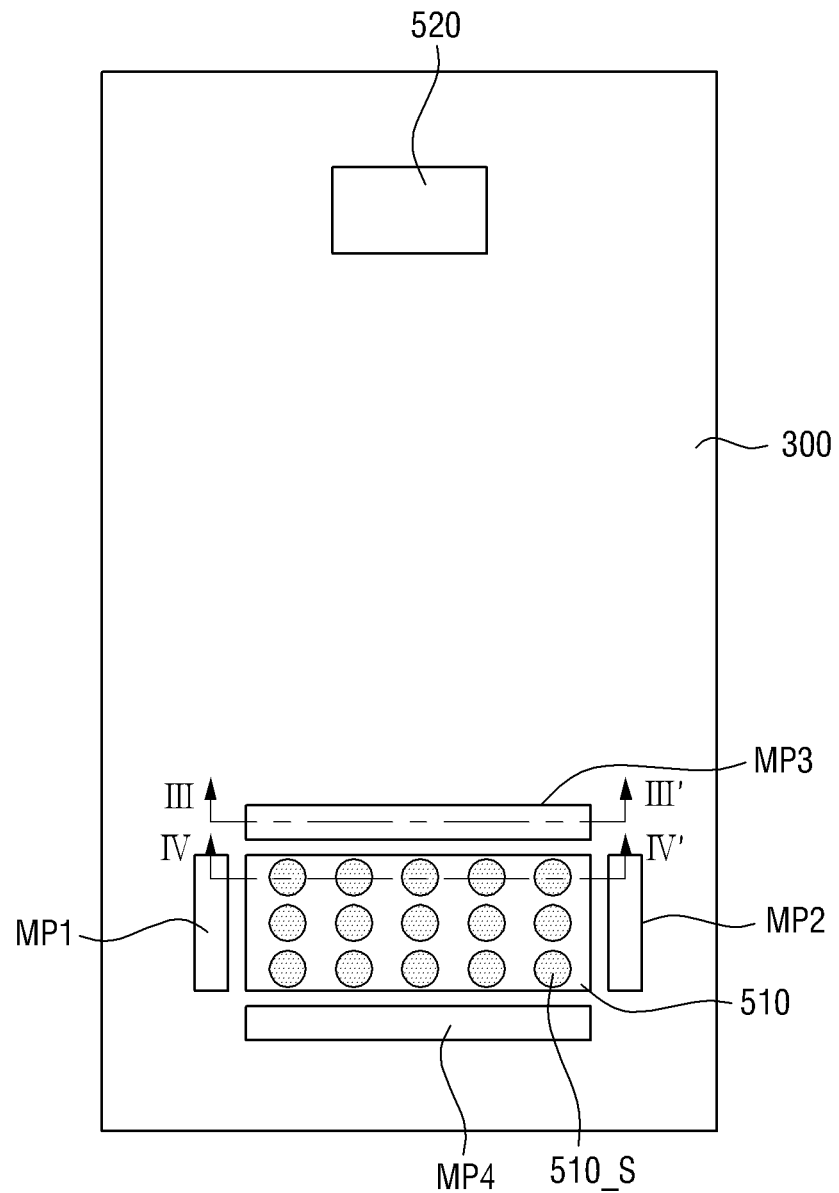
FIGS. 15A to 15C are plan views showing an arrangement relationship of a sound generator, an ultrasonic detection device, and motion pixels.
Figure 15B:
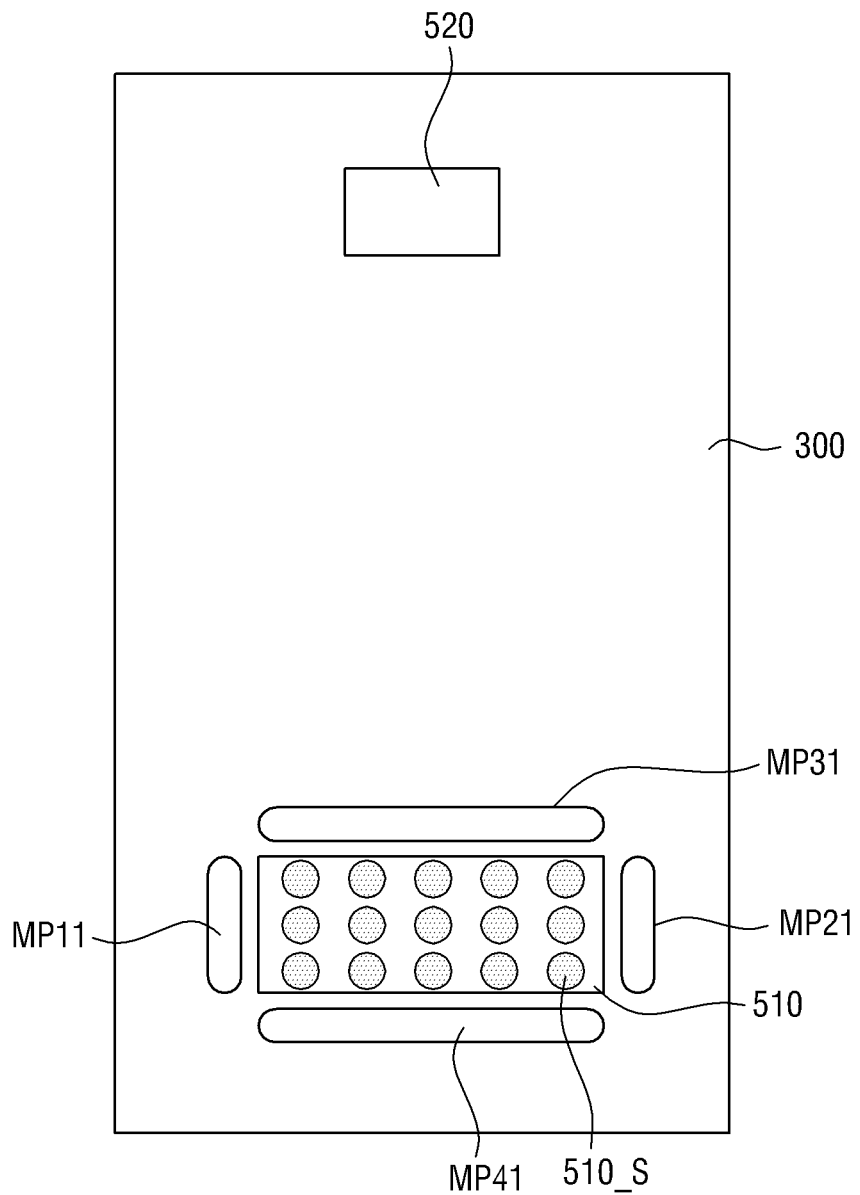
Figure 15C:
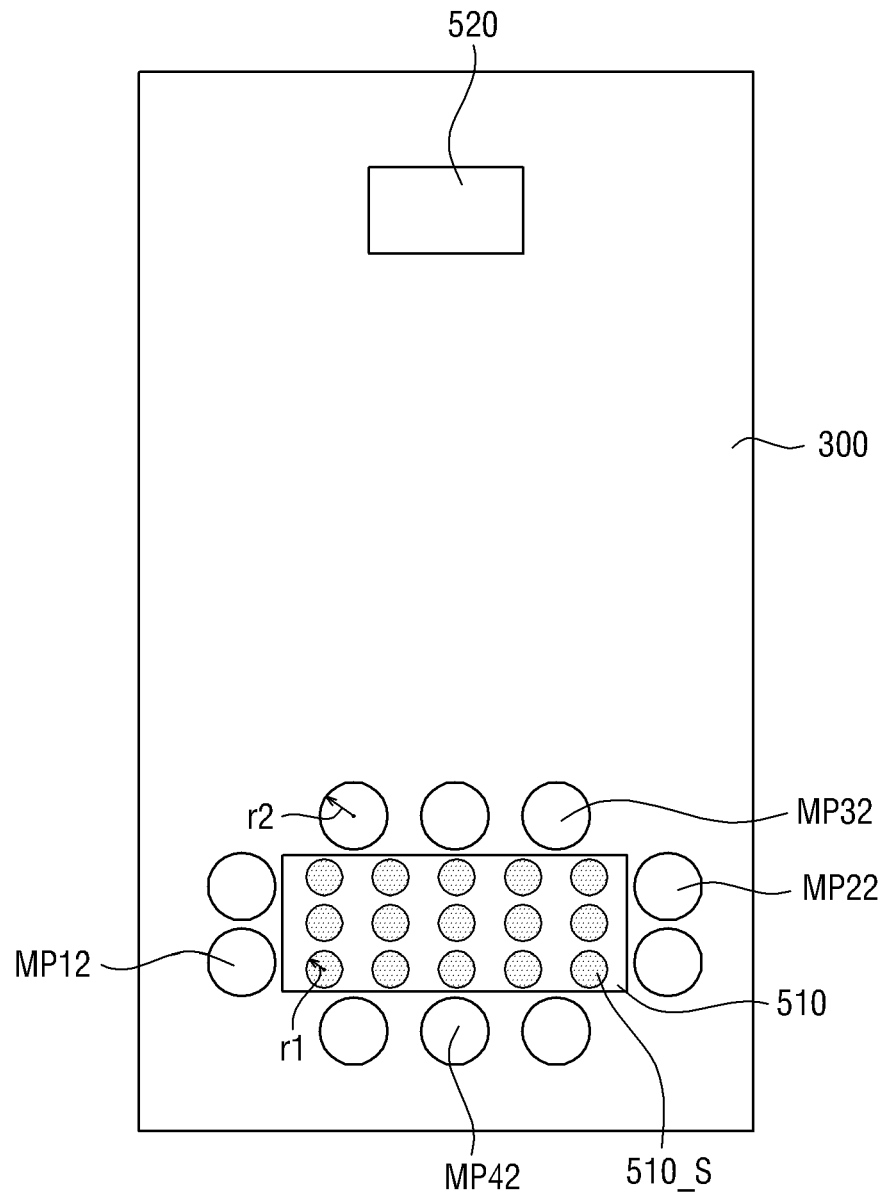
Figure 16:
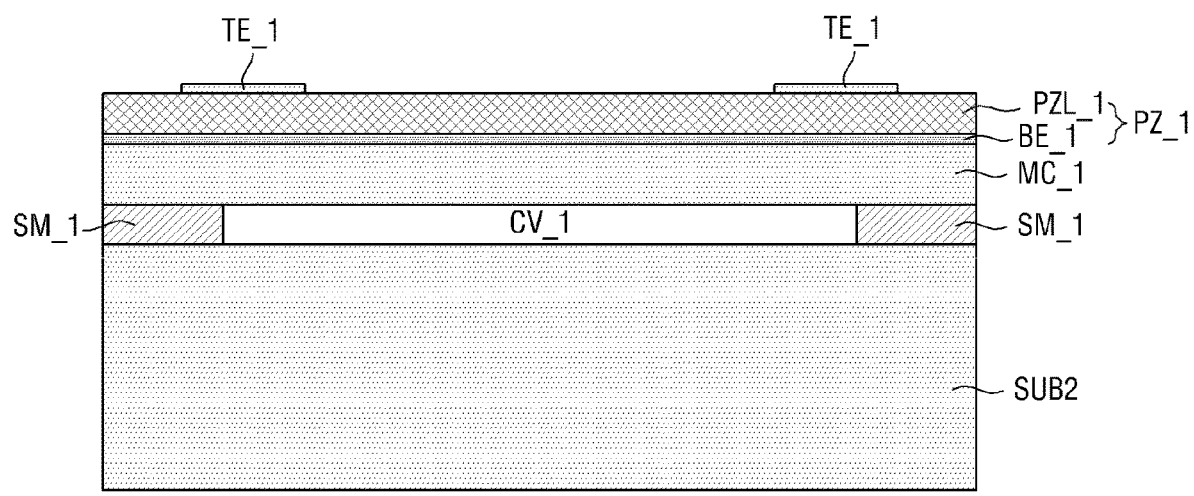
FIG. 16 is a cross-sectional view taken along the line III-III' of FIG. 15A.
Figure 17:
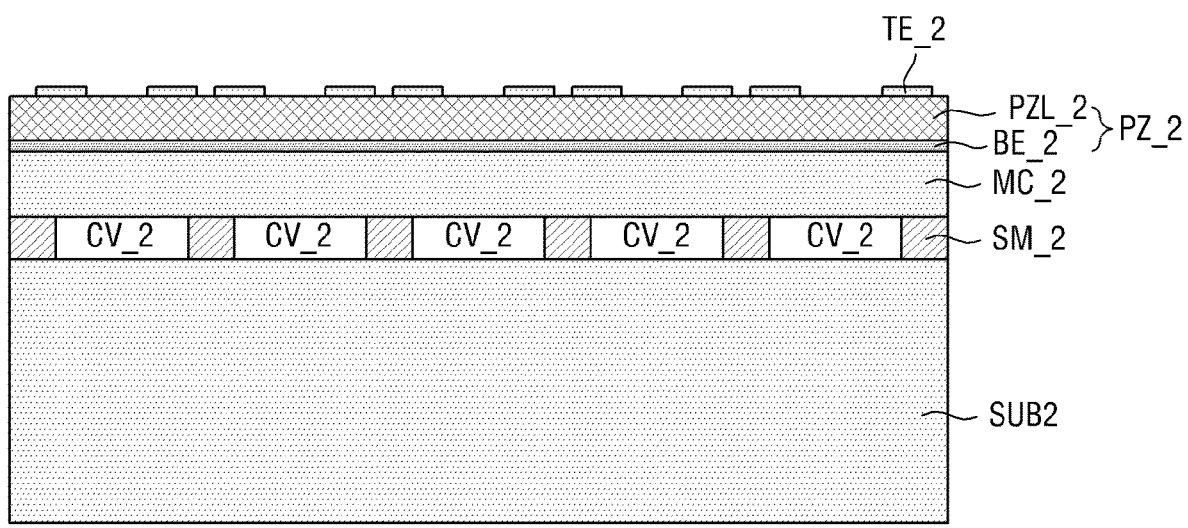
FIG. 17 is a cross-sectional view taken along the line IV-IV' of FIG. 15A.
Figure 18A:
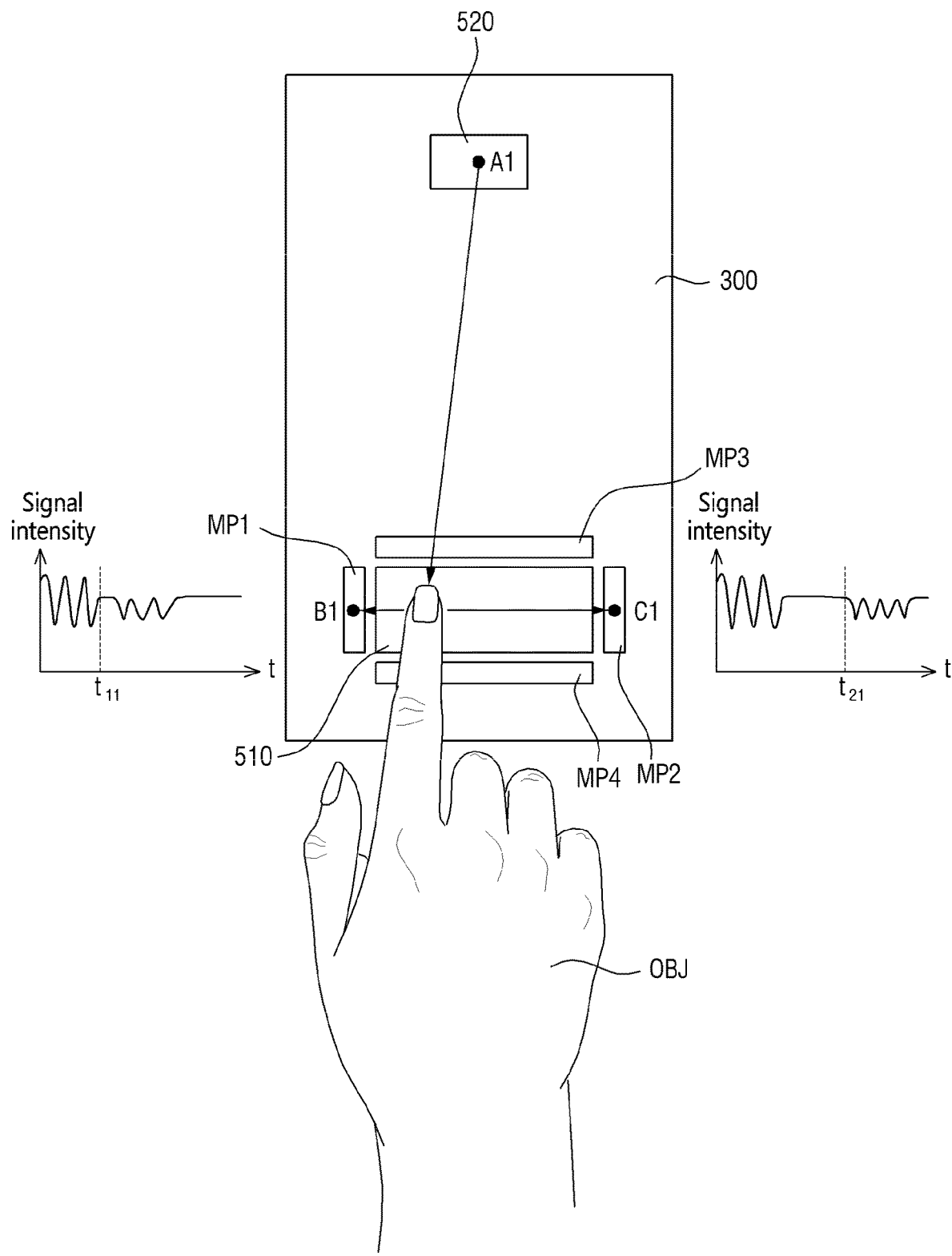
FIGS. 18A and 18B are plan views showing a motion sensing method of the ultrasonic detection device of FIG. 14.
Figure 18B:
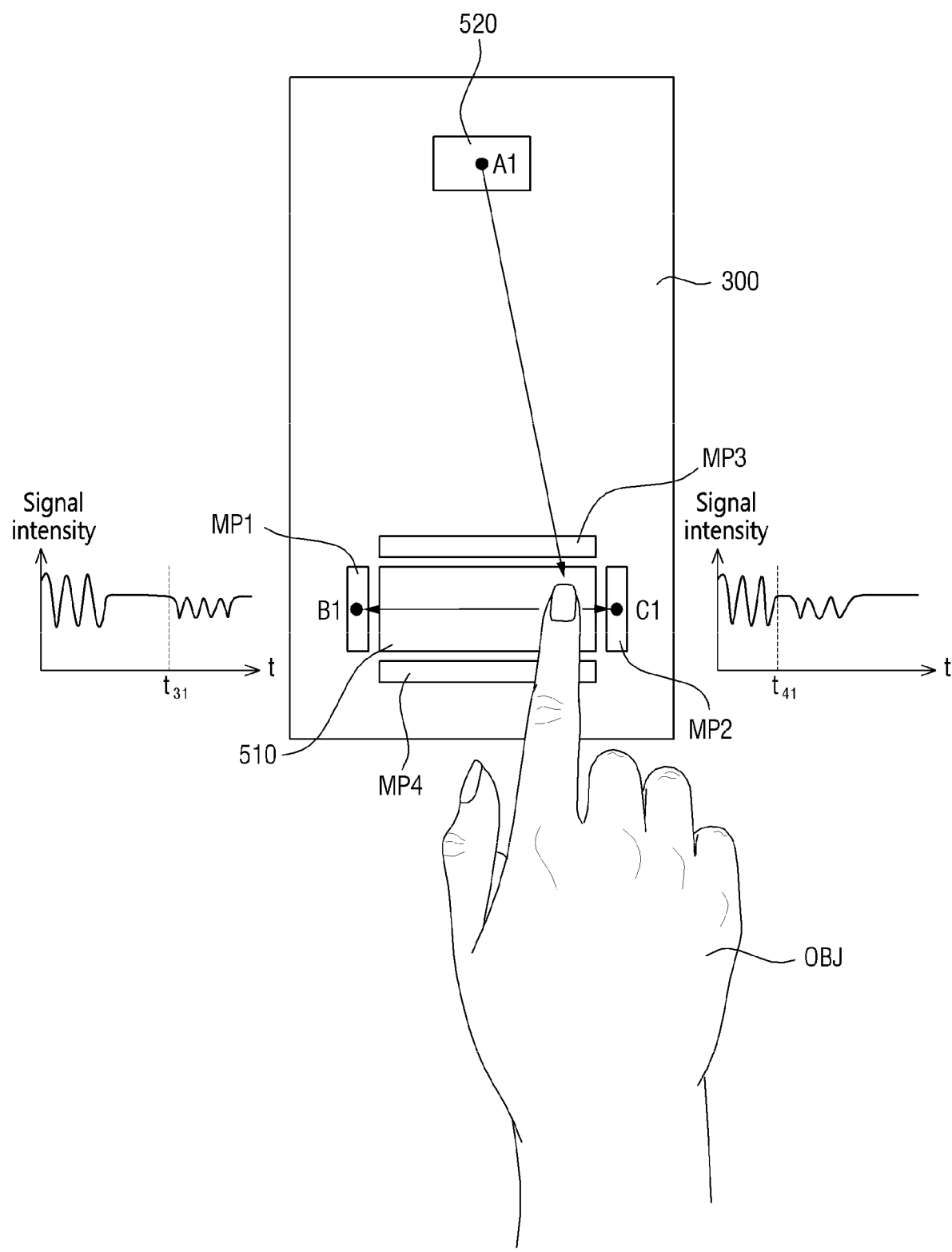

FIG. 14 is a perspective view showing a motion sensing method of an ultrasonic detection device according to another embodiment. FIGS. 15A to 15C are plan views showing an arrangement relationship of a sound generator, an ultrasonic detection device, and motion pixels. FIG. 16 is a cross-sectional view taken along the line III-III' of FIG. 15A. FIG. 17 is a cross-sectional view taken along the line IV-IV' of FIG. 15A. FIGS. 18A and 18B are plan views showing a motion sensing method of the ultrasonic detection device of FIG. 14.

Referring to FIGS. 12, 14 to 18A, and 18B, the present embodiment is different from the embodiment described with reference to FIG. 12 in that the ultrasonic sensor 510 further includes motion pixels MP.

For example, the ultrasonic sensor 510 may have a rectangular shape in a plan view. The plurality of motion pixels MP may be arranged to be spaced apart from the four sides of the rectangular shape of the ultrasonic sensor 510, and each of the motion pixels MP may have a rectangular shape in a plan view.

In one embodiment, the horizontal and vertical lengths of a first motion pixel MP1 adjacent to the left side of the ultrasonic sensor 510 and of a second motion pixel MP2 adjacent to the right side of the ultrasonic sensor 510 may be f and e, respectively. In this embodiment, the area of each of the output portions of the first and second motion pixels MP1 and MP2 is e*f. The horizontal and vertical lengths of the third motion pixel MP3 adjacent to the top side of the ultrasonic sensor 510 and the fourth motion pixel MP4 adjacent to the bottom side of the ultrasonic sensor 510 may be c and d, respectively. In this embodiment, the area of each of the output portions of the third and fourth motion pixels MP3 and MP4 is c*d. In some embodiments, the sound generator 520 may include an output portion having a rectangular shape in a plan view. When the horizontal and vertical lengths of the rectangular output portion of the sound generator 520 are a and b, respectively, the area of the rectangular output portion is a*b.

As shown in FIG. 12, each of the plurality of ultrasonic sensor units 510_S included in the ultrasonic sensor 510 may have an output portion having a circular shape in a plan view, and the radius of the circular output portion may be r. In this embodiment, the area of the circular output portion is $r^2\pi$. In this embodiment, when the radius r of the ultrasonic sensor unit 510_S has a value much smaller than the horizontal length f or vertical length e of each of the first and second motion pixels MP1 and MP2 and has a value much smaller than the horizontal length c or vertical length d of each of the third and fourth motion pixels MP3 and MP4, the area of the output portion of the ultrasonic sensor unit 510_S may be smaller than the area of the output portion of each of the first to fourth motion pixels MP1, MP2, MP3, and MP4, even if the radius r is multiplied by the circumference ratio π.

Because the frequency is inversely proportional to the area of the sound output portion, the frequency of each of the first to fourth motion pixels MP1, MP2, MP3, and MP4, each having a larger area than the output portion of the ultrasonic sensor unit 510_S, may be lower than the frequency of the ultrasonic sensor unit 510_S. Thus, each of the first to fourth motion pixels MP1, MP2, MP3, and MP4, may transmit and receive an ultrasound US having a frequency band lower than the frequency band (for example, 50 kHz to 200 kHz) used by the ultrasonic sensor unit 510_S to transmit and receive an ultrasound US. For example, the respective frequency band of the first to fourth motion pixels MP1, MP2, MP3, and MP4, may be closer to the frequency band (for example, an audible sound wave region of 1 kHz to 20 kHz and a part of an ultrasonic region of 20 kHz or higher) of a sound wave that can be output by the sound generator 520. In this embodiment, the voice signal transmitted from the sound generator 520 is better received by the ultrasonic sensor 510.

The planar shape of each of the first to fourth motion pixels MP1, MP2, MP3, and MP4 is not limited to a rectangular shape. For example, as shown in FIG. 15B, the planar shape of each of the first to fourth motion pixels MP11, MP21, MP31, and MP41 may be an elliptical shape having rounded corners. In this embodiment, the intensity of the ultrasounds US output from the first to fourth motion pixels MP11, MP21, MP31, and MP41 may be more uniform. Further, as shown in FIG. 15C, the planar shape of each of the first to fourth motion pixels MP12, MP22, MP32, and MP42 may be a circular shape. In this embodiment, the radius r2 of each of the first to fourth motion pixels MP12, MP22, MP32, and MP42 may be greater than the radius r1 of the ultrasonic sensor unit 510_S.

Referring to FIGS. 16 and 17, the cavity CV_1 of the first to fourth motion pixels MP1, MP2, MP3, and MP4 may have a larger horizontal length than the cavity CV_2 of each of the ultrasonic sensor units 510_S. The ultrasonic sensor units 510_S may include a piezoelectric layer stack PZ_2 and a mechanical layer MC_2 that are supported by a support member SM_2 and are on the cavity CV_2. The piezoelectric layer stack PZ_2 may include a piezoelectric layer PZL_2, a lower electrode BE_2, and a plurality of upper electrodes TE_2. In contrast, the first to fourth motion pixels MP1, MP2, MP3, and MP4 may include a piezoelectric layer stack PZ_1 and a mechanical layer MC_1 which are supported by the support member SM_1 and are on the cavity CV_1, and may be integrated with each other. The piezoelectric layer stack PZ_1 may include a piezoelectric layer PZL_1, a lower electrode BE_1, and upper electrodes TE_1.

Hereinafter, a method of sensing a user's motion will be described in more detail with reference to FIGS. 18A and 18B.

The main processor 710 may control an ultrasound US to be output from the sound generator 520. For example, the main processor 710 may output ultrasound data to the second sound driver 770. The second sound driver 770 may generate a third driving voltage and a fourth driving voltage according to the ultrasound data. The second sound driver 770 may transmit the third driving voltage and the fourth driving voltage to the third electrode 513 and fourth electrode 514 of the ultrasonic output unit UU of the sound generator 520 through the sound connector 740 and the sound circuit board 530.

The ultrasonic output unit UU of the sound generator 520 may vibrate according to the third driving voltage and the fourth driving voltage, and the display panel 300 may vibrate up and down according to the vibration of the ultrasonic output unit UU of the sound generator 520. Thus, the display device 10 may output an ultrasound having a sound pressure level of 50 dB or more in a frequency band of 20 kHz to 200 kHz.

Each of the first to fourth motion pixels MP1, MP2, MP3, and MP4 detects the ultrasound reflected by an object OBJ. For example, when the user's finger OBJ is at the left side of the ultrasonic sensor 510, the ultrasound US transmitted from one point A1 of the sound generator 520 may be reflected by the user's finger OBJ located on the left side of the ultrasonic sensor 510, and may be detected at one point B1 at the first motion pixel MP1 and one point C1 at the second motion pixel MP2. In this embodiment, the time point t11 at which the ultrasound US is received at one point B1 at the first motion pixel MP1 is faster than the time point t21 at which the ultrasound US is received at one point C1 at the second motion pixel MP2. For example, the ultrasound US may be received at one point B1 at the first motion pixel MP1 before the ultrasound US is received at one point C1 at the second motion pixel MP2. In contrast, when the user's finger OBJ is located at the right side of the ultrasonic sensor 510, the ultrasound US transmitted from one point A1 of the sound generator 520 may be reflected by the user's finger OBJ located on the right side of the ultrasonic sensor 510, and may be detected at one point B1 at the first motion pixel MP1 and one point C1 at the second motion pixel MP2. In this embodiment, the time point t31 at which the ultrasound US is received at one point B1 at the first motion pixel MP1 is slower than the time point t41 at which the ultrasound US is received at one point C1 at the second motion pixel MP2. For example, the ultrasound US may be received at one point B1 at the first motion pixel MP1 after the ultrasound US is received at one point C1 at the second motion pixel MP2. In this embodiment, the main processor 710 may determine that the user's finger OBJ performs a swipe gesture from the left side to the right side, and, in response, may perform a preset or set operation.

For convenience of explanation, although it is illustrated that the user's finger OBJ moves left and right, vertical movement and diagonal movement of the user's finger OBJ, and a gesture of the user's finger OBJ drawing a figure may also be detected through the first to fourth motion pixels MP1, MP2, MP3, and MP4. Furthermore, although it is illustrated that only two time measurements are taken at each of point B and point C while the finger OBJ swipes from left to right, more than two time measurements may be taken.

Figure 19:
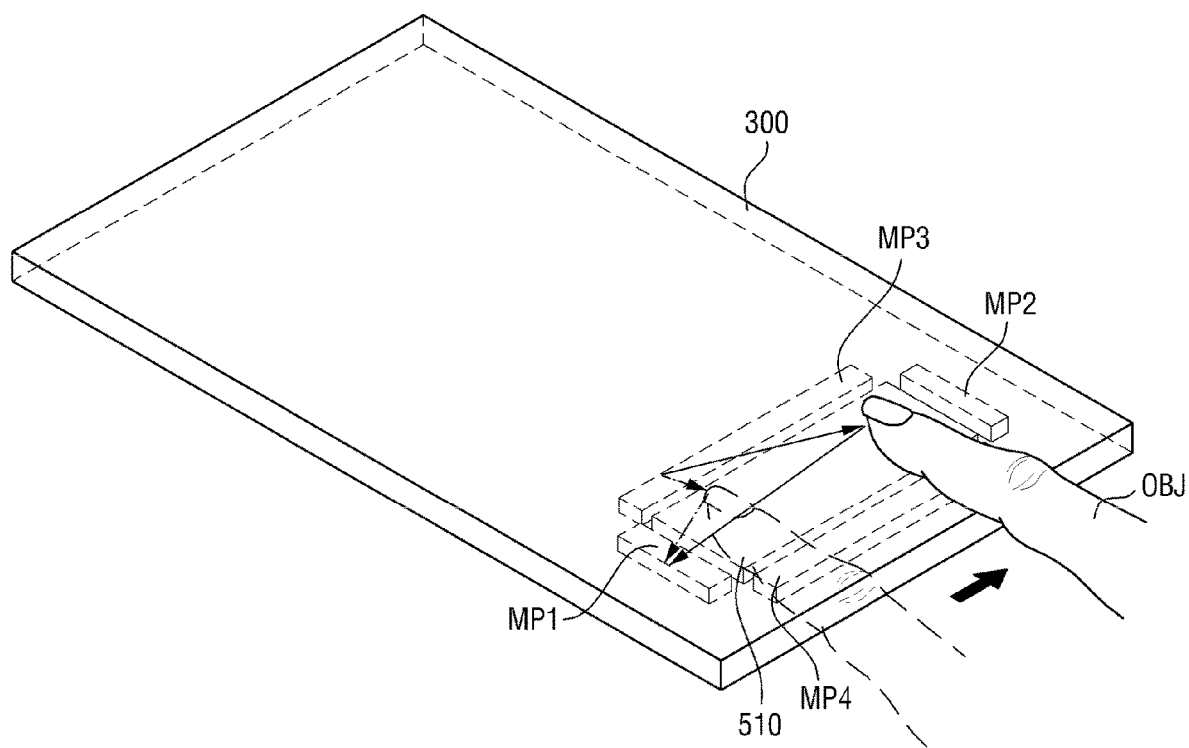
FIG. 19 is a perspective view showing a motion sensing method of an ultrasonic detection device according to another embodiment.
Figure 20A:
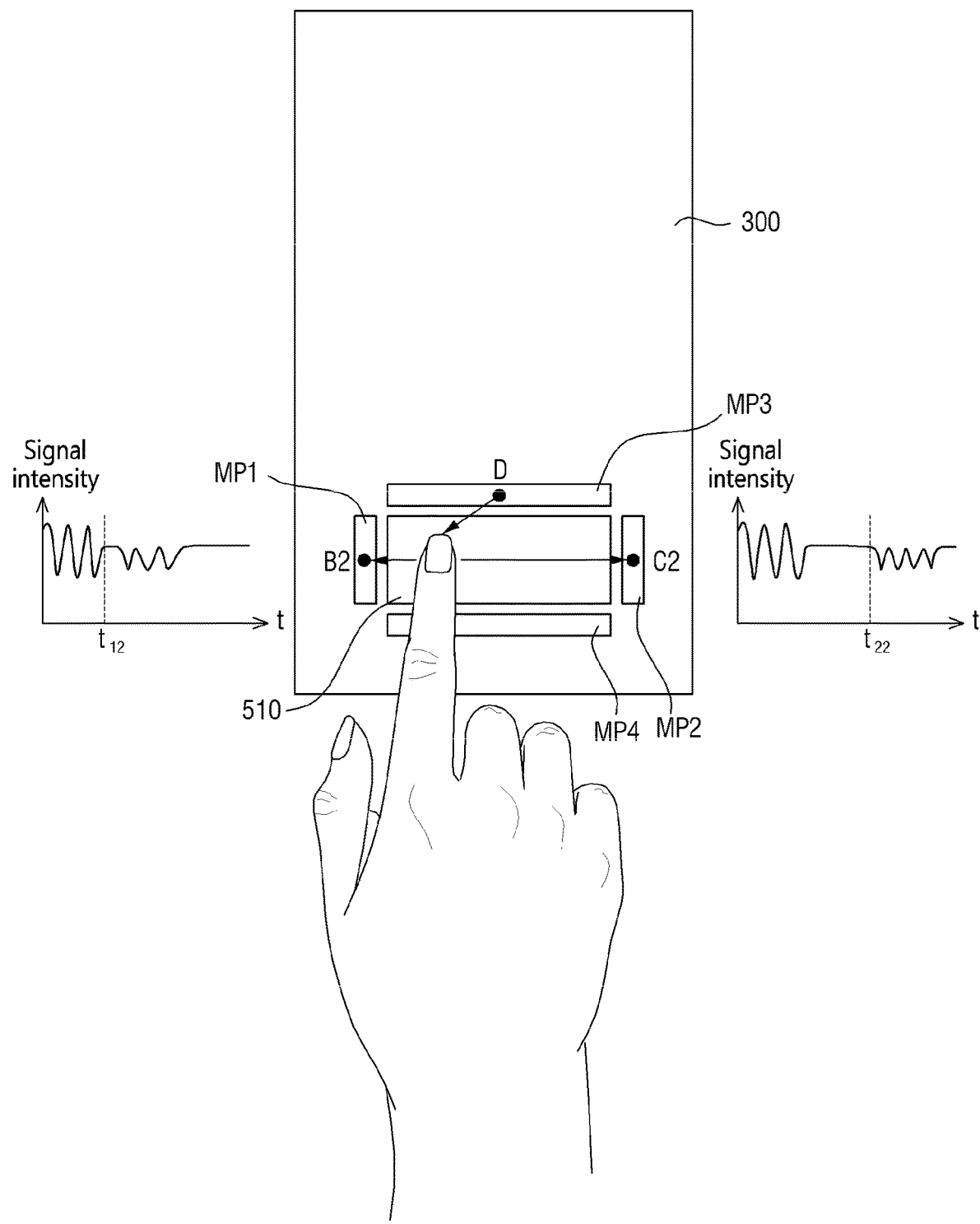
FIGS. 20A and 20B are plan views showing a motion sensing method of the ultrasonic detection device of FIG. 19.
Figure 20B:
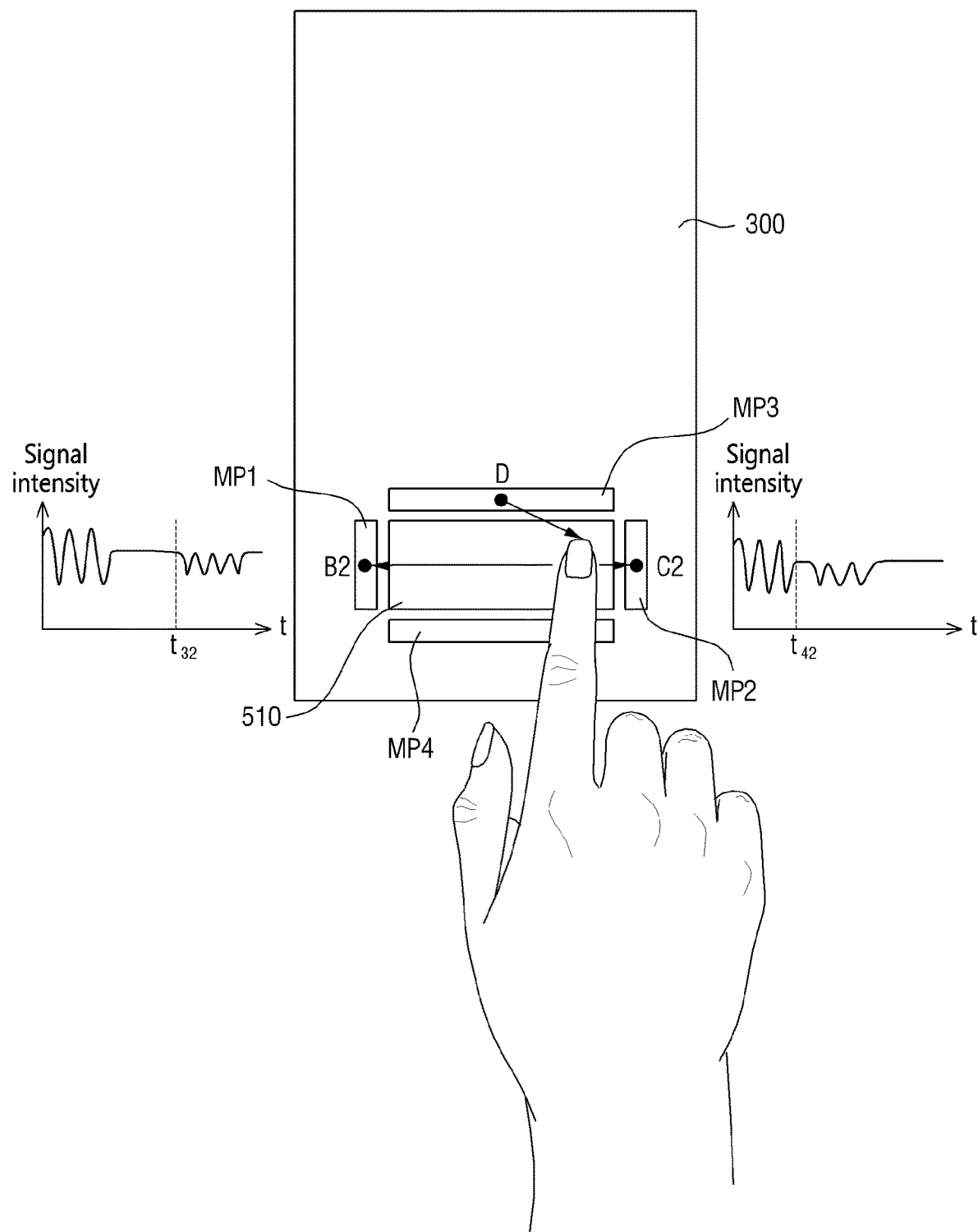

FIG. 19 is a perspective view showing a motion sensing method of an ultrasonic detection device according to another embodiment, and FIGS. 20A and 20B are plan views showing a motion sensing method of the ultrasonic detection device of FIG. 19.

Referring to FIGS. 19, 20A, and 20B, the present embodiment is different from the embodiment described with reference to FIG. 14 in that only the first to fourth motion pixels MP1, MP2, MP3, and MP4 are provided without the sound generator 520.

The user's gestures may be detected using all of the first to fourth motion pixels MP1, MP2, MP3, and MP4 as transmitters and receivers of ultrasounds US. For example, all of the first to fourth motion pixels MP1, MP2, MP3, and MP4 may output the ultrasounds US during the transmission period of the ultrasounds US, and all of the first to fourth motion pixels MP1, MP2, MP3, and MP4 may receive the ultrasounds US during the reception period of the ultrasounds US. Because the area of the output portions of the first to fourth motion pixels MP1, MP2, MP3, and MP4 is relatively large compared to the output portions of the ultrasonic sensor units 510_S shown in FIG. 12, the output portions of the first to fourth motion pixels MP1, MP2, MP3, and MP4 may output ultrasounds US having sufficient intensity to detect the user's gestures.

Further, two motion pixels may be selected from the first to fourth motion pixels MP1, MP2, MP3, and MP4 to define two groups of motion pixels. In this embodiment, the user's gestures may be detected by using the first group as a transmitter of ultrasounds US and using the second group as a receiver of ultrasounds US. For example, when the user's frequently used gestures are left and right swipes, the first and second motion pixels MP1 and MP2 may always be used as a receiver, and the third and fourth motion pixels MP3 and MP4 may always be used as a transmitter.

Further, two motion pixels may be selected from the first to fourth motion pixels MP1, MP2, MP3, and MP4 to define two groups of motion pixels. In this embodiment, the user's gestures may be detected by alternately applying the functions of the first group and the second group, where the first group is used as a transmitter of ultrasounds US and the second group is used as a receiver of ultrasounds US. It is beneficial when the user uses various gestures evenly without preferring specific gestures such as, for example, up and down swipes and left and right swipes.

A method of sensing a user's motion will be described in more detail with reference to FIGS. 20A and 20B. Hereinafter, this method will be described with the assumption that the first and second motion pixels MP1 and MP2 are always used as receivers, and the third and fourth motion pixels MP3 and MP4 are always used as transmitters.

The main processor 710 controls the ultrasounds US to be output from the third and fourth motion pixels MP3 and MP4.

Each of the first and second motion pixels MP1 and MP2 detects the ultrasound US reflected by an object OBJ. For example, when the user's finger OBJ is at the left side of the ultrasonic sensor 510, the ultrasound US transmitted from one point D of the third motion pixel MP3 may be reflected by the user's finger OBJ located on the left side of the ultrasonic sensor 510, and may be detected at one point B2 at the first motion pixel MP1 and at one point C2 at the second motion pixel MP2. In this embodiment, the time point t12 at which the ultrasound US is received at one point B2 at the first motion pixel MP1 is faster than the time point t22 at which the ultrasound US is received at one point C2 at the second motion pixel MP2. For example, the ultrasound US may be received at one point B2 at the first motion pixel MP1 before the ultrasound is received at one point C2 at the second motion pixel MP2. In contrast, when the user's finger OBJ is at the right side of the ultrasonic sensor 510, the ultrasound US transmitted from one point D of the third motion pixel MP3 may be reflected by the user's finger OBJ located on the right side of the ultrasonic sensor 510, and may be detected at one point B2 at the first motion pixel MP1 and at one point C2 at the second motion pixel MP2. In this embodiment, the time point t32 at which the ultrasound US is received at one point B2 at the first motion pixel MP1 is slower than the time point t42 at which the ultrasound US is received at one point C2 at the second motion pixel MP2. For example, the ultrasound US may be received at one point B2 at the first motion pixel MP1 after the ultrasound is received at one point C2 at the second motion pixel MP2. In this embodiment, the main processor 710 may determine that the user's finger OBJ performs a swipe gesture from the left side to the right side, and, in response, may perform a preset or set operation.

For convenience of explanation, although it is illustrated that the user's finger OBJ moves left and right, vertical movement and diagonal movement of the user's finger OBJ, and a gesture of the user's finger OBJ drawing a figure may also be detected through the first to fourth motion pixels MP1, MP2, MP3, and MP4. Furthermore, although it is illustrated that only two time measurements are taken at each of point B and point C while the finger OBJ swipes from left to right, more than two time measurements may be taken.

Although certain exemplary embodiments and implementations have been described herein, other embodiments and modifications will be apparent from this description. Accordingly, the subject matter of the present disclosure is not limited to such embodiments, but rather to the broader scope of the claims and various obvious modifications and equivalent arrangements that would be apparent to a person of ordinary skill in the art.

What is claimed is:

1. A display device, comprising:
a display panel including a pixel array layer on one surface of a first substrate to display an image;
a sound generator to transmit an ultrasound; and
an ultrasonic sensor to receive an ultrasound reflected by an object on the display panel,
wherein the sound generator and the ultrasonic sensor are on another surface of the first substrate opposite to the one surface of the first substrate,
wherein the ultrasonic sensor includes a plurality of ultrasonic sensor units arranged in a matrix form,
wherein the ultrasonic sensor senses the object by using the reflected ultrasound received by the plurality of ultrasonic sensor units, and
wherein each of the ultrasonic sensor units includes:
a first support member on a second substrate;
a first cavity including an empty space surrounded by the first support member;
a first piezoelectric layer on the first cavity;
a first lower electrode between the first piezoelectric layer and the first cavity; and
a first upper electrode on the first piezoelectric layer.

2. The display device of claim 1, wherein: each of the ultrasonic sensor units further includes a first mechanical layer between the first cavity and the first piezoelectric layer.

3. The display device of claim 1, wherein:
the first cavity has a circular shape in a plan view.

4. The display device of claim 1, wherein:
the sound generator includes a sound output unit for outputting an audible sound wave by vibrating the display panel, and an ultrasonic output unit for outputting an ultrasound by vibrating the display panel.

5. The display device of claim 4,
wherein the sound output unit includes a first electrode, a second electrode, and a first vibration layer, and
the ultrasonic output unit includes a third electrode, a fourth electrode, and a second vibration layer,
wherein an area of the first vibration layer is larger than an area of the second vibration layer.

6. A display device, comprising:
a display panel including a pixel array layer on one surface of a first substrate to display an image;
a sound generator to transmit an ultrasound; and
an ultrasonic sensor to receive an ultrasound reflected by an object on the display panel,
wherein the sound generator and the ultrasonic sensor are on another surface of the first substrate opposite to the one surface of the first substrate,
wherein the ultrasonic sensor includes a plurality of ultrasonic sensor units arranged in a matrix form, wherein the ultrasonic sensor senses the object by using the reflected ultrasound received by the plurality of ultrasonic sensor units, wherein the display device further includes a main processor that determines a time difference of the reflected ultrasound received by the plurality of ultrasonic sensor units, wherein the time difference is determined two or more times while the object is in motion, and wherein the main processor utilizes the two or more time differences to determine the motion of the object.

7. The display device of claim 6, wherein:

the time difference includes a first time difference that is determined by a difference between a first time and a second time;

the first time corresponds to when the ultrasound is received by a first ultrasonic sensor unit at a left side of the ultrasonic sensor and the second time corresponds to when the ultrasound is received by a second ultrasonic sensor unit at a right side of the ultrasonic sensor;

the first time is shorter than the second time when the object is at the left side of the ultrasonic sensor;

the first time is faster than the second time when the object is at the right side of the ultrasonic sensor; and the main processor determines the motion of the object in a first direction by using the two or more first time differences.

8. The display device of claim 6, wherein:

the time difference includes a second time difference that is determined by a difference between a third time and a fourth time;

the third time corresponds to when the ultrasound is received by a third ultrasonic sensor unit at a top side of the ultrasonic sensor and the fourth time corresponds to when the ultrasound is received by a fourth ultrasonic sensor unit at a bottom side of the ultrasonic sensor;

the third time is shorter than the fourth time when the object is at the top side of the ultrasonic sensor;

the third time is faster than the fourth time when the object is at the bottom side of the ultrasonic sensor; and the main processor determines the motion of the object in a second direction by using the two or more second time differences.

9. A display device, comprising:

a display panel including a pixel array layer on one surface of a first substrate to display an image;

a sound generator to transmit an ultrasound; and an ultrasonic sensor to receive an ultrasound reflected by an object on the display panel, wherein the sound generator and the ultrasonic sensor are on another surface of the first substrate opposite to the one surface of the first substrate, wherein the ultrasonic sensor includes a plurality of motion pixels, wherein the ultrasonic sensor senses the object by using the reflected ultrasound received by the plurality of motion pixels, wherein the display device further includes a main processor that determines a time difference of the reflected ultrasound received by the plurality of motion pixels, wherein the time difference is determined two or more times while the object is in motion, and wherein the main processor uses the two or more time differences to determine the motion of the object.

10. The display device of claim 9, wherein:

the ultrasonic sensor includes a plurality of ultrasonic sensor units, and each of the ultrasonic sensor units includes:
a first support member on a second substrate;
a first cavity including an empty space surrounded by the first support member;
a first piezoelectric layer on the first cavity;
a first lower electrode between the first piezoelectric layer and the first cavity; and
a first upper electrode on the first piezoelectric layer.

11. The display device of claim 10, wherein:

each of the ultrasonic sensor units further includes a first mechanical layer between the first cavity and the first piezoelectric layer.

12. The display device of claim 10, wherein:

the first cavity has a circular shape in a plan view.

13. The display device of claim 10, wherein:

each of the motion pixels includes:
a second support member on a second substrate;
a second cavity including an empty space surrounded by the second support member;
a second piezoelectric layer on the second cavity;
a second lower electrode between the second piezoelectric layer and the second cavity; and
a second upper electrode on the second piezoelectric layer.

14. The display device of claim 13, wherein:

the ultrasonic sensor has a rectangular shape in a plan view, and the plurality of motion pixels are spaced apart from the four sides of the rectangular shape by set intervals.

15. The display device of claim 14, wherein:

each of the motion pixels has any one of a circular shape, an elliptic shape, and a rectangular shape in the plan view.

16. The display device of claim 14, wherein:

a planar area of the second cavity is larger than a planar area of the first cavity.

17. The display device of claim 9, wherein:

the time difference is determined by a difference between a first time and a second time;

the first time corresponds to when the ultrasound is received by a first motion pixel at a left side of the ultrasonic sensor and the second time corresponds to when the ultrasound is received by a second motion pixel at a right side of the ultrasonic sensor;

the first time is shorter than the second time when the object is at the left side of the ultrasonic sensor;

the first time is faster than the second time when the object is at the right side of the ultrasonic sensor; and the main processor determines the motion of the object in a first direction by using the two or more time differences.

18. The display device of claim 9, wherein:

the sound generator includes a sound output unit for outputting an audible sound wave by vibrating the display panel, and an ultrasonic output unit for outputting an ultrasound by vibrating the display panel.

* * * * *